(12) United States Patent
Smyth

(10) Patent No.: US 12,250,304 B2
(45) Date of Patent: Mar. 11, 2025

(54) CACHING ENCRYPTED CONTENT IN AN OBLIVIOUS CONTENT DISTRIBUTION NETWORK, AND SYSTEM, COMPUTER-READABLE MEDIUM, AND TERMINAL FOR THE SAME

(71) Applicant: CRYPTO STREAM LTD., Hertfordshire (GB)

(72) Inventor: Benjamin Ashley Smyth, Paris (FR)

( * ) Notice: Subject to any disclaimer, the term of this patent is extended or adjusted under 35 U.S.C. 154(b) by 315 days.

(21) Appl. No.: 17/522,900

(22) Filed: Nov. 9, 2021

(65) Prior Publication Data
US 2022/0069982 A1 Mar. 3, 2022

Related U.S. Application Data

(63) Continuation of application No. PCT/US2020/060069, filed on Nov. 11, 2020, which is a continuation-in-part of application No. PCT/US2020/000018, filed on May 11, 2020.

(60) Provisional application No. 62/845,867, filed on May 9, 2019.

(51) Int. Cl.
*H04L 9/08* (2006.01)
*G06F 12/0802* (2016.01)

(52) U.S. Cl.
CPC .......... *H04L 9/088* (2013.01); *G06F 12/0802* (2013.01); *G06F 2212/402* (2013.01)

(58) Field of Classification Search
CPC ................. H04L 9/088; H04L 63/0227; H04L 2463/062; H04L 9/0822; H04L 63/0428; H04L 2209/76; H04L 9/16; G06F 12/0802; G06F 2212/402
See application file for complete search history.

(56) References Cited

U.S. PATENT DOCUMENTS

| | | | |
|---|---|---|---|
| 2005/0102427 A1* | 5/2005 | Yokota | H04L 67/1014 709/245 |
| 2006/0193474 A1* | 8/2006 | Fransdonk | H04L 63/061 380/279 |
| 2014/0223099 A1* | 8/2014 | Kidron | G06F 16/435 711/118 |
| 2016/0105400 A1* | 4/2016 | Straub | H04L 63/062 713/168 |
| 2019/0182349 A1* | 6/2019 | Goel | H04L 67/55 |
| 2020/0280434 A1* | 9/2020 | Cioraca | H04L 9/0819 |

* cited by examiner

*Primary Examiner* — Bruce S Ashley
(74) *Attorney, Agent, or Firm* — The Harris Firm

(57) ABSTRACT

The disclosure describes methods and arrangements for caching encrypted content. Embodiments of the described inventions make use of a middle box to serve encrypted content rather than requiring a server to answer each request for content with a separate and distinct response, thereby allowing a network to operate effectively and efficiently even when serving encrypted content that looks different each time it is requested.

30 Claims, 16 Drawing Sheets

CACHING ENCRYPTED CONTENT IN AN OBLIVIOUS CONTENT DISTRIBUTION NETWORK, AND SYSTEM, COMPUTER-READABLE MEDIUM, AND TERMINAL FOR THE SAME

CROSS-REFERENCE TO RELATED APPLICATIONS

This application is a continuation application that claims the benefit, under 35 U.S.C. § 120, of international patent application Ser. No. PCT/US20/60069, filed Nov. 11, 2020; this application is also a continuation-in-part application that claims the benefit, under 35 U.S.C. § 120, of international patent application Ser. No. PCT/US20/00018, filed May 11, 2020, which claims the benefit, under 35 U.S.C. § 119(e), of U.S. patent application Ser. No. 62/845,867, filed May 9, 2019, the entire contents of all three of which are hereby incorporated herein by reference.

TECHNICAL FIELD

This disclosure relates to a method for improving the function of a computer network by decreasing latency and increasing security.

BACKGROUND

Internet communication today typically involves intermediary middle boxes like caches, compression proxies, or virus scanners. Despite initial efforts in both industry and academia, until the present invention there has been little success in integrating middle boxes into secure communications between a user terminal and a content provider's server.

Transparent caching, where content is replicated inside operator networks and served from within the network rather than from the content provider's remote server, saves bandwidth, thereby decreasing associated costs and improving end-user experience by reducing delays in accessing content. But transparent caching cannot reduce trip times of encrypted internet traffic because transparent caching only utilizes unencrypted content.

Content Distribution Networks (CDNs) are physically closer to end-users than remote servers, and if the content provider is willing to share content and cryptographic keys, then it is possible for CDNs to reduce network congestion and concomitant delays.

Specific limitations of former approaches that seek to improve CDNs are illustrated in the following:

Karagiannis et al. (U.S. Ser. No. 10/389,524) propose introducing middle boxes into secure communications between a client and server. Karagiannis et al. enable a middle box to process content of the traffic sent between client and server. To accomplish this, Karagiannis et al. share cryptographic keys belonging to server over a secure channel with the middle box.

Smyth et al. (WO2018019368) propose that all communication between the middle box, terminal and server is initiated by the server. In essence, the server is offloading delivery to the middle box. The performance advantages of this approach are limited because the terminal is still required to send requests for content all the way to the server, which is a further round-trip distance than the middle box.

Businesses with online operations are reluctant to share customer or other data with networks they do not own or control such as CDNs. It would be desirable therefore to provide methods for distributing encrypted content via CDNs without allowing CDNs to access the content, which would increase CDN use by customers that are prohibited from sharing, for example because of contractual, regulatory, or legal obligations, or are otherwise unwilling to share certain content due to business considerations.

SUMMARY

One aspect of the current disclosure is directed to a method at a terminal, a server, a middle box, and one or more communication channels that allow the terminal, server and middle box to communicate. The terminal transmits a request for content to the server. The middle box receives from the server data including, but not limited to, an identifier (optionally, pseudo-identifier) and encrypted content. The middle box associates the identifier (optionally, pseudo-identifier) with encrypted content. The middle box transmits to the terminal data including, but not limited to, the encrypted content associated with the identifier (optionally, pseudo-identifier). The server and/or other device provides (optionally directly or indirectly via for example a subscription service) one or more key(s) and communicates the key(s) such that only the terminal can use the key(s), e.g., exclusively to the terminal(s) such that the middle box(es) never has (or alternately uses) any one or more of the key(s).

In another or alternate aspect, the terminal and server may be connected by one or more communication channels. Likewise, the server and middle box may be connected by one or more communication channels. It is contemplated that the networks may include multiple servers and multiple middle boxes. Initially, the server associates content with data including, but not limited to, identifiers (optionally, pseudo-identifiers) and encrypted content. Association can be carried out on the fly, e.g., the server might only associate content with identifiers (optionally, pseudo-identifiers) and encrypted content when it receives a request for content. The middle box associates identifiers (optionally, pseudo-identifiers) with encrypted content. Such associations at the middle box may be provided in advance of any terminal request for content. For example, middle boxes may be provided with encrypted content related to soon-to-be-released content so that they will be ready for high demand. The terminal and server establish data including, but not limited to, a session key. The terminal encrypts data including, but not limited to, a request for content with the session key. It transmits to the server data including, but not limited to, the encrypted request for content. The server receives data including, but not limited to, the terminal's encrypted request for content and decrypts the encrypted request with the session key to recover data including, but not limited to, a request for content. The server encrypts data including, but not limited to, the key used to encrypt the encrypted content with the session key. It transmits to the terminal data including, but not limited to, the encrypted key. The server and/or another device provides (optionally directly or indirectly via for example a subscription service) one or more key(s) and communicates the key(s) to the terminal(s) such that the terminal can use the key(s), e.g., to the terminal(s) but no middle box(es) has (or alternately uses) any one or more of the key(s).

In another or alternate aspect, the terminal receives data including, but not limited to, the encrypted key and decrypts the encrypted key with the session key to recover data including, but not limited to, the key used to encrypt the encrypted content. The server transmits to the middle box data including, but not limited to, the identifier (optionally, pseudo-identifier) associated with the requested content. The middle box receives from the terminal data including, but not limited to, an identifier (optionally, pseudo-identifier), wherein the middle box (optionally, already) associates the identifier (optionally, pseudo-identifier) with encrypted content, and transmits to the terminal data including, but not limited to, the encrypted content associated with the identifier (optionally, pseudo-identifier). The terminal receives from the middle box data including, but not limited to, the encrypted content associated with the identifier (optionally, pseudo-identifier) i.e., the encrypted content associated with requested content, and decrypts that encrypted content associated with the key used to encrypt the encrypted content, thereby recovering the content. The server and/or another device provides (optionally directly or indirectly via for example a subscription service) one or more key(s) and communicates the key(s) to the terminal(s) such that the middle box(es) never has (or alternately uses) any one or more of the key(s).

In another or alternate aspect, a decryption key may be at the terminal as a result of various processes. For example, a server may have furnished the key to the terminal, a subscription service (or other service or entity) having one or more other storage or transmission device(s) may have provided the key to the terminal, etc.

Additional or alternative aspects of the disclosure are found in the appended claims. Further aspects, embodiments, features, and advantages of the embodiments, as well as the structure and operation of various embodiments are described in detail below with reference to accompanying drawings.

BRIEF DESCRIPTION OF THE DRAWINGS

In the accompanying drawings, which form a part of the specification and are to be read in conjunction therewith, and in which like reference numerals are used to indicate like features in the various views.

DETAILED DESCRIPTION

Embodiments of the disclosure are concerned with the reuse of encrypted content. Ultimately, though not in certain method, terminal, system and computer-readable media embodiments, these instructions may or may not also be executed at one or more server(s), storage device(s) or other computer hardware capable of reusing encrypted content.

We use the term "middle box" to denote an intermediary computer networking device that transforms, augments, inspects, filters, and/or manipulates traffic. Middle boxes include, but are not limited to, firewalls, intrusion detection systems, proxies, caches, network address translators, and protocol accelerators.

As used herein, an oblivious content distribution network is an arrangement wherein various data can be shared among a server, one or more terminals, and one or more middle boxes. In an oblivious content distribution network, the server and the one or more terminals possess key(s) for encrypting and decrypting content, but the one or more middle boxes do not have access to key(s).

As used herein, communicatively connected means connected through a channel capable of transmission of electrical, electromagnetic and/or optical signals that carry digital data streams representing various types of information. Communicatively connected includes, but is not limited to, e.g., connection by way of cables and/or wireless transmission.

As used herein, a pseudo-identifier is a version of an identifier associated with content(s) or encrypted content(s) that is disguised to prevent recognition by other than a trusted party which possesses insight into the scheme used to disguise sufficient to be able to deduce the undisguised identifier and content(s) or encrypted content(s). Similarly, a pseudo-request is a version of a request for content associated with content(s) or encrypted content(s) that is disguised to prevent recognition by other than a trusted party which possesses insight into the scheme used to disguise sufficient to be able to deduce the undisguised request for content and content(s) or encrypted content(s).

As used herein, "one or more of A, B, and C", denotes, at least one element selected from the group A, B, and C (e.g., only A, but not B and not C), and at least one but not necessarily any A, or at least one but not necessarily any B, or at least one but not necessarily any C, or any combination thereof.

Figure 1:
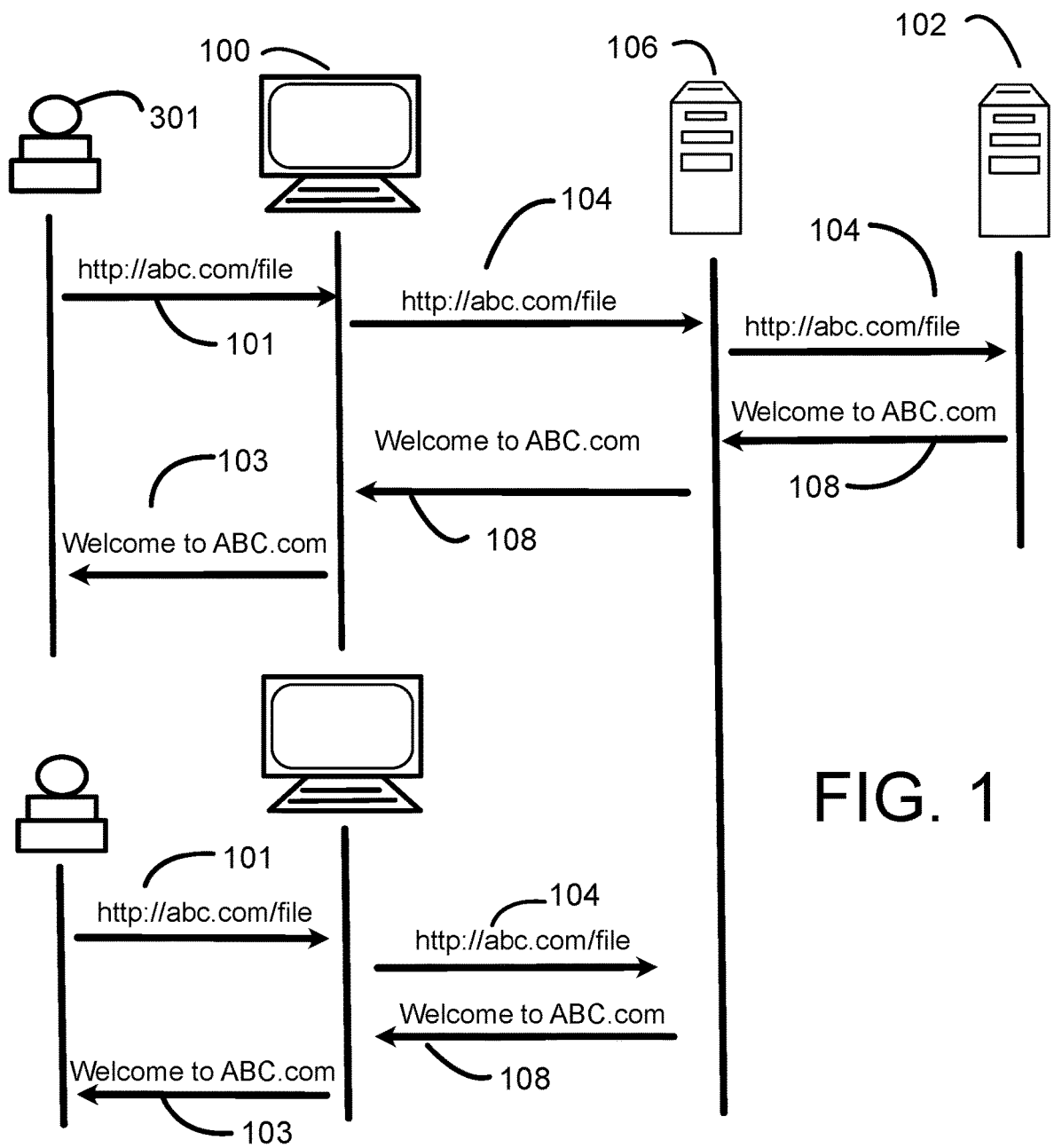
FIG. 1 illustrates a terminal, server, and middle box, wherein a content is transmitted from the server to the middle box and the content can be served from the middle box upon a second request for the same content, which may be used in embodiments.

As illustrated in FIG. 1, terminal computer 100 requests 101 content (http://abc.com/file) from server 102. A second request 104 (http://abc.com/file) need not be sent all the way to server 102. Rather, a content distribution the network that has cached the content at cache 106 can serve the same content 108 in response to that request can simply provide content 103 again from its cache to terminal 100 operated by users 301. This saves bandwidth and reduces latency, thereby reducing bandwidth-costs and improving end-user experience. Transparent caching instructs the network to record the first end-user (request for http://abc.com/file), store response ("Welcome to ABC.com"), and serve that response upon the second request for http://abc.com/file, thereby saving bandwidth and reducing latency, because the network need only communicate externally once.

Figure 2:
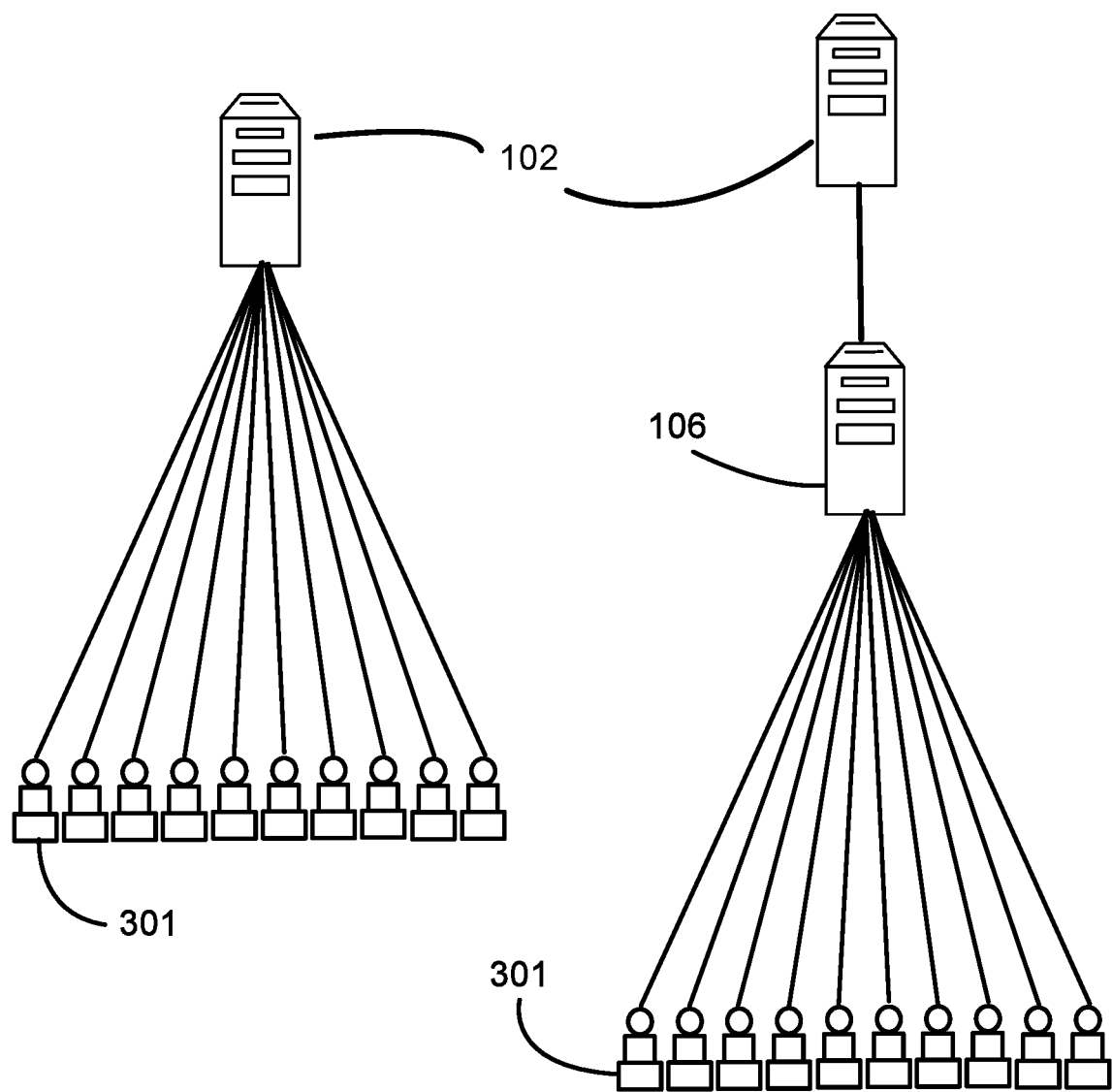
FIG. 2 illustrates a relative location of the middle box closer to the user terminals than the server of FIG. 1.

As illustrated in FIG. 2, exemplary CDN has cache (middle box) 106 that is "closer" in network terms to users 301 than server 102. Content reaches users 301 more quickly from middle box 106 than server 102. Thus, caching by the CDN reduces latency. Serving end-users directly (left), with no intermediate CDN, increases latency when compared to serving end-users via a CDN (right).

Figure 3:
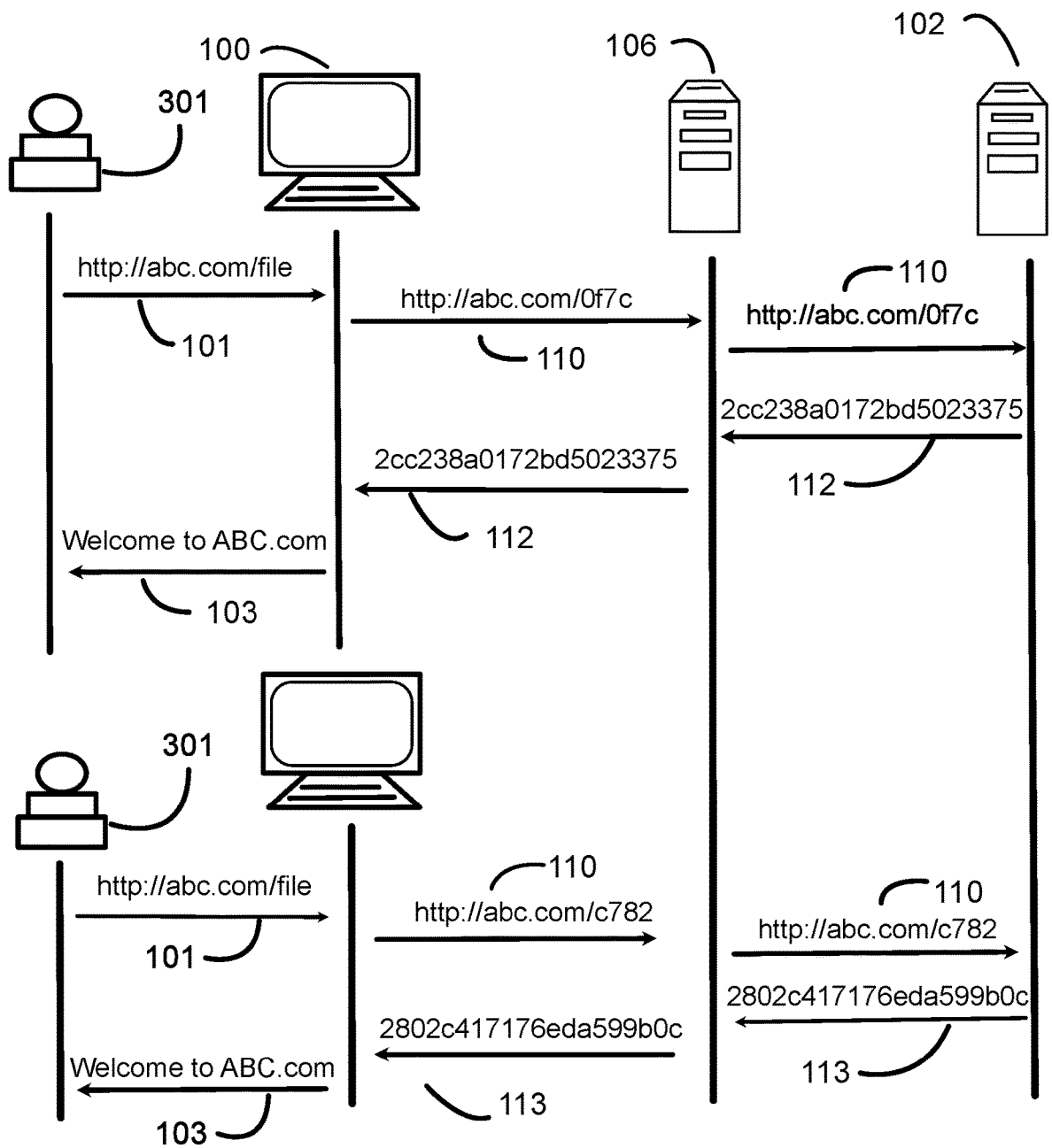
FIG. 3 illustrates a problem with reuse of encrypted content by a middle box.

As illustrated in FIG. 3, terminal computer 100 operated by user 301 requests content 101 (http://abc.com/file) from server 102. In the first instance request 110 encodes to 0f7c and in the second instance request 110 encodes to c782. A content distribution the network that has cached the content at middle box 106 cannot serve the same encrypted content. Response 103 "Welcome to ABC.com" might encrypt to 112 2cc238a0172bd5023375 in the first instance and to 113 2802c4f7176eda599b0c in the second.

Figure 4:
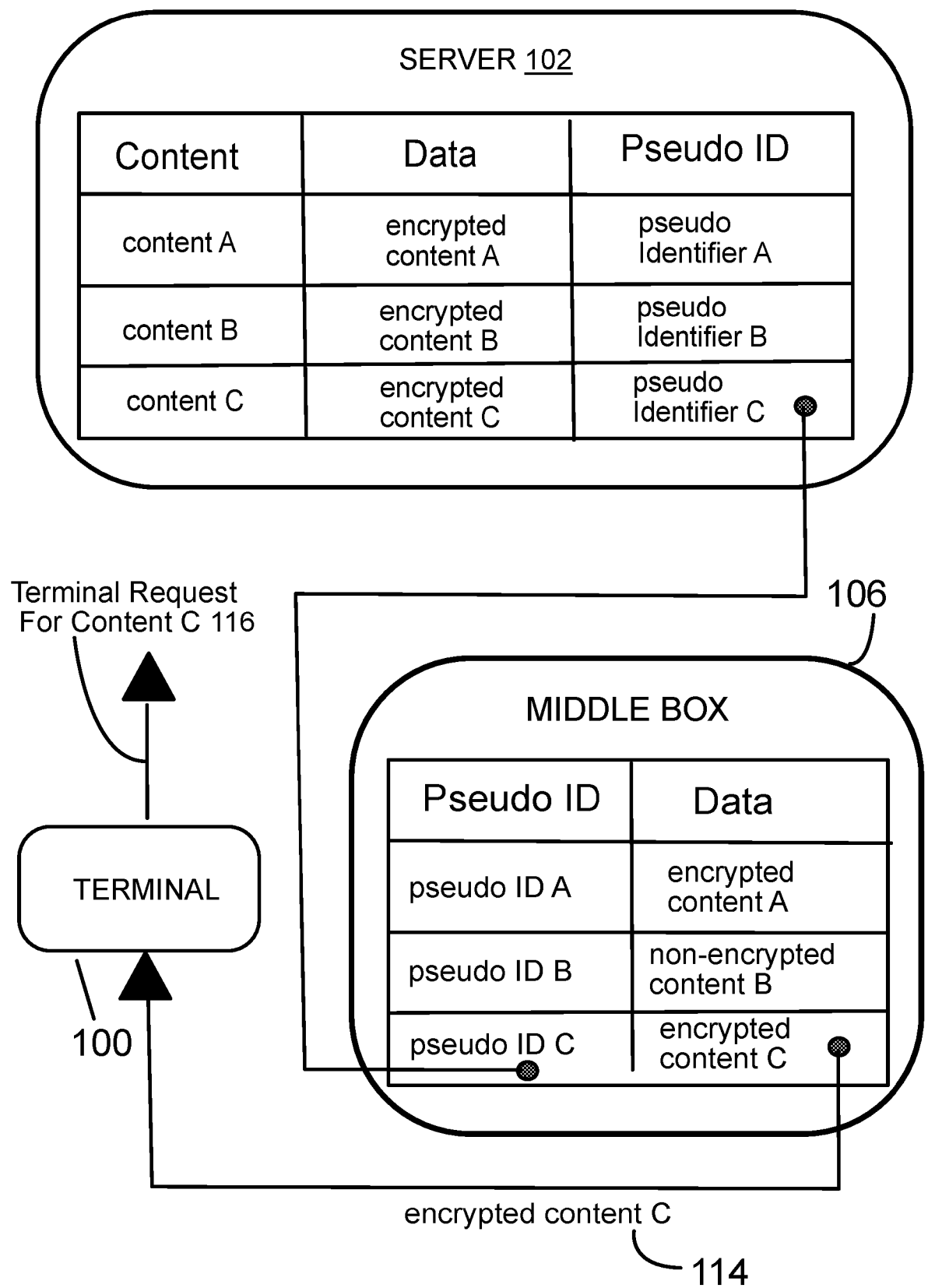
FIG. 4 illustrates a use of pseudo-identifiers associated with encrypted content, along with several network features that may be used in embodiments.

As illustrated in FIG. 4, terminal 100 requests 116 content C. Server 102 in response, sends identifier (optionally, pseudo-identifier) C to middle box 106. At middle box 106, identifier (optionally, pseudo-identifier) C is associated with 114 encrypted content C which is then sent to terminal 100. Terminal 100 then decrypts content C. A decryption key may be at the terminal as a result of various processes. Server 102 indirectly or directly provides one or more decryption key and communicates the decryption key to the terminal such that the middle box never has a version of the decryption key that can be used by the middle box. For example, the server may have furnished the key to the terminal, that may be a function of a session key used by the terminal and server, or a subscription service (or other service or location or entity having another device (such as one or more additional or unrelated digital store(s), digital storage device(s), server) may have provided the key to the terminal, etc.

Figure 5:
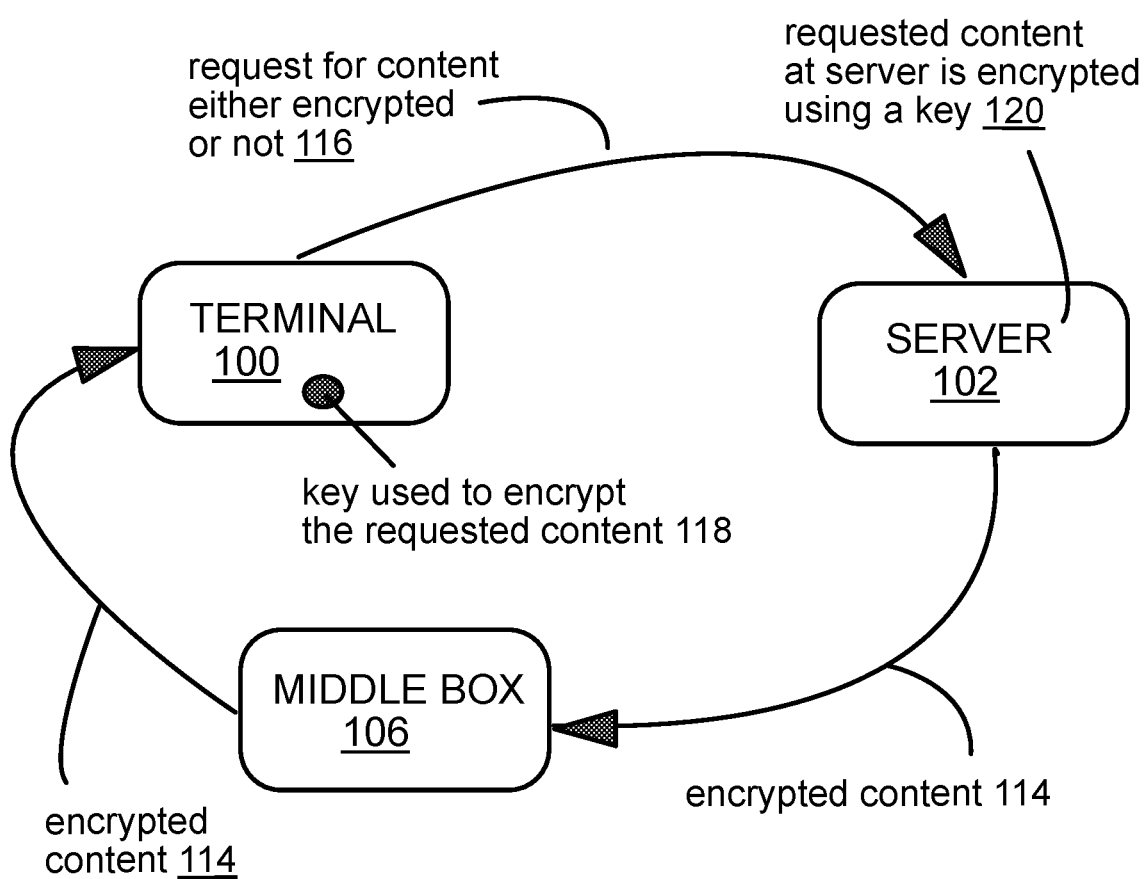
FIG. 5 illustrates a terminal's request for content, encryption of the content at a server, and transmission of encrypted content from a server to a terminal by way of a middle box, which may be used in embodiments.

As illustrated in FIG. 5, terminal 100, server 102, and middle box 106 are connected by communication channels. Terminal 100 transmits to server 102 data 116 including, but not limited to, a request for content. Server 102 encrypts content 120 using a key. Server 102 shares 118 the key used to encrypt encrypted content 120 with terminal 100. Server 102 indirectly or directly provides the key and communicates the key to terminal 100 such that the middle box never has the key, or never has a version that can be used by the middle box. Terminal 100 receives from middle box 106 data including, but not limited to, encrypted content 114 associated with the identifier (optionally, pseudo-identifier), i.e., the encrypted content associated with requested content and decrypts 118 it using the key (shared by the terminal) used to encrypt the data, thereby recovering the content.

Figure 6:
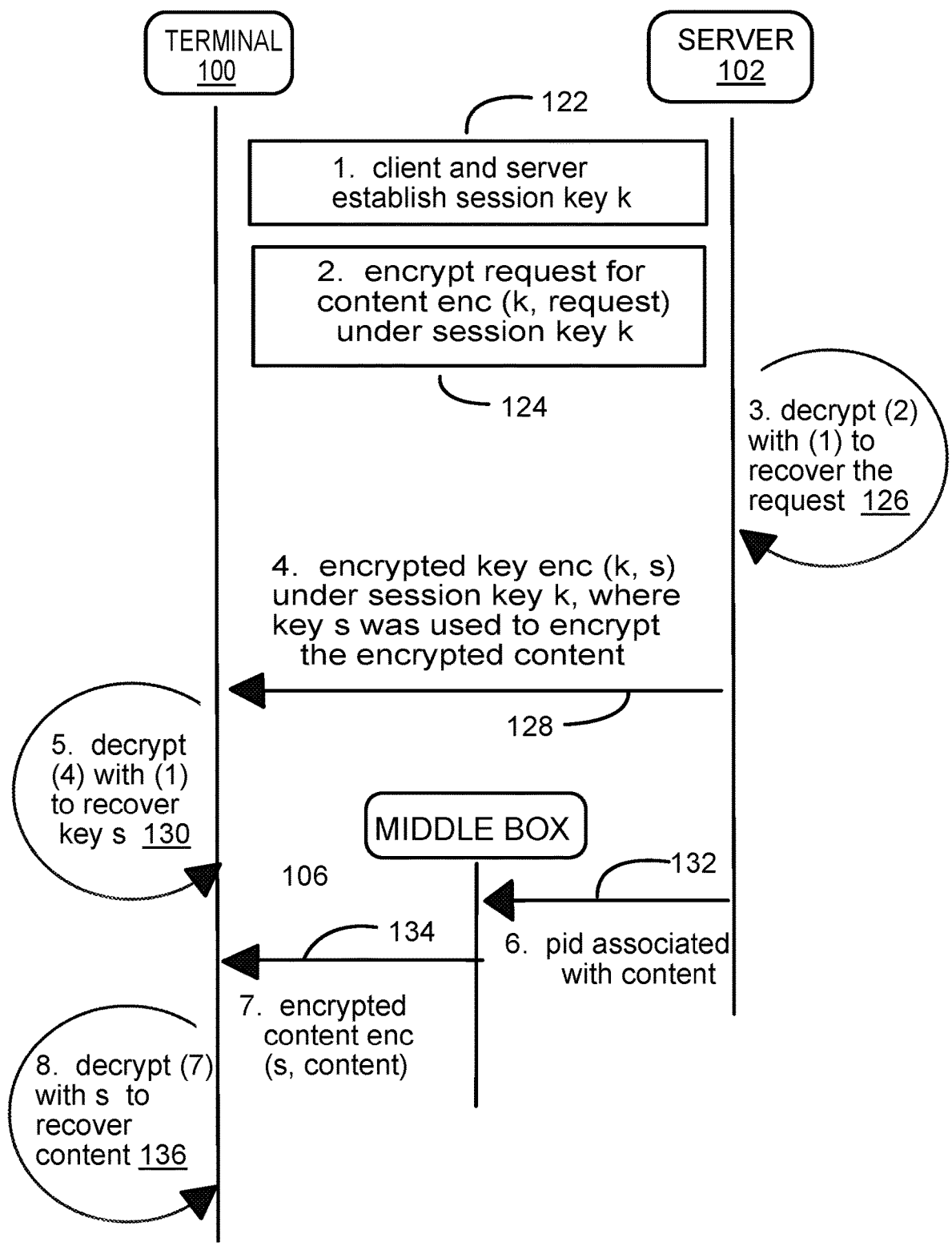
FIG. 6 illustrates one process in which an encryption key is shared by the server of FIG. 1 with the terminal of FIG. 1 making a request for encrypted content.

As illustrated in FIG. 6, one process in which an encryption key is shared by server 102 with terminal 100 is making a request for encrypted content. Terminal 100 and server 102 establish a session key k 122 under which the terminal request is made 124. Server 102 decrypts the request 126 using the session key k. Content is encrypted with encryption key s. Encryption key s is sent to terminal 100 under session key k 128. Terminal 100 decrypts encryption key s using session key k 130. Server 102 thus (alone or alternately in instances of one or more of multiple servers and multiple terminals and multiple middle boxes) provides one or more key(s) and communicates the key(s) to the terminal(s) such that the middle box(es) never/have has or uses the key(s). Server 102 sends identifier (optionally, pseudo-identifier) 132 specifying the encrypted content requested to middle box 106. Middle box 106, in turn, relays 134 the encrypted content associated with that identifier (optionally, pseudo-identifier) (could have been previously associated and stored at middle box 106) to terminal 100. Terminal 100 then uses the encryption key s to decrypt 136 the encrypted content.

Figure 7:
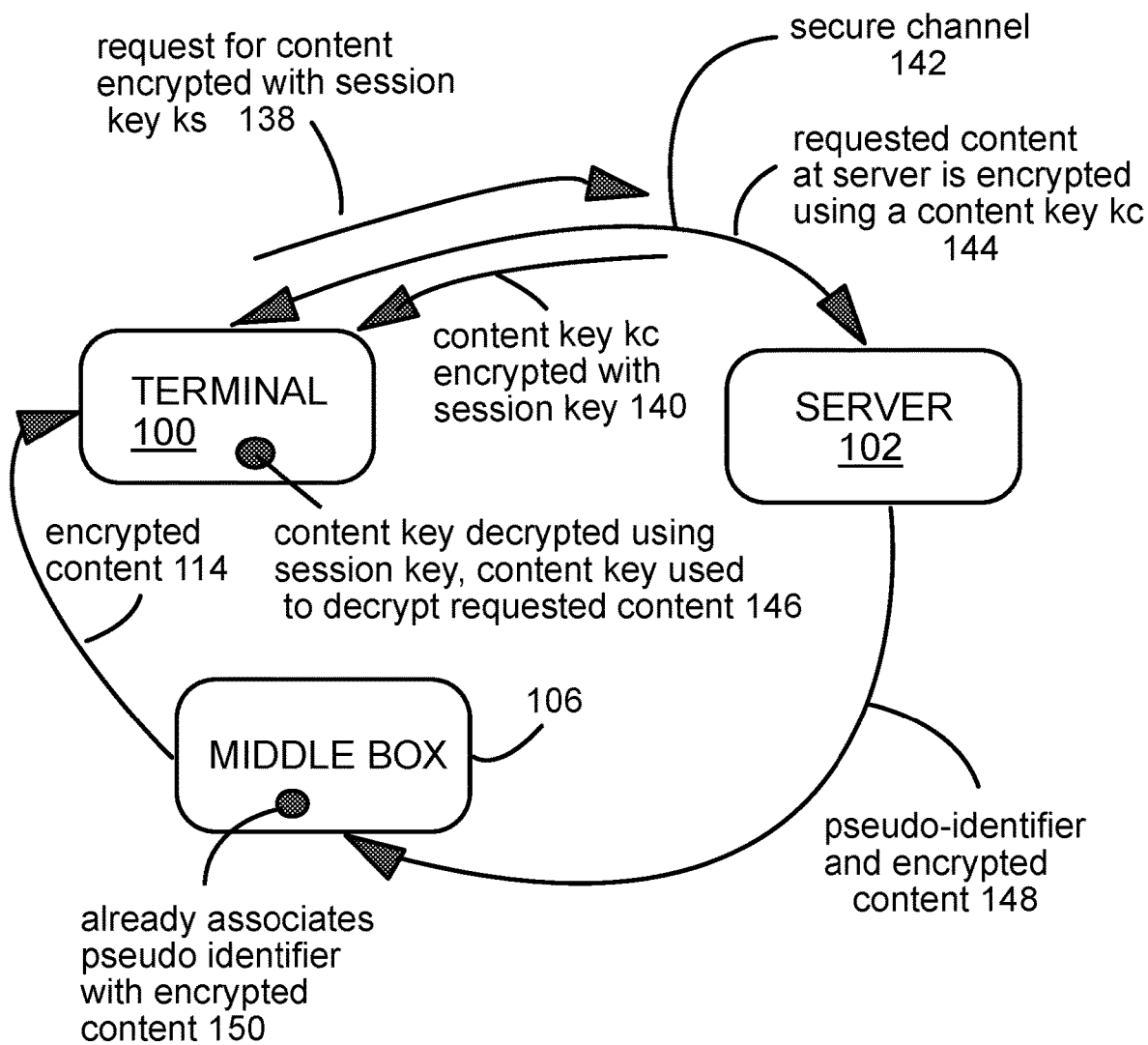
FIG. 7 illustrates the use of a secure channel to transmit an encryption key to the terminal of FIG. 1 making a request for encrypted content, that may be used in embodiments.

As illustrated in FIG. 7, secure channel 142 is used to transmit 140 an encryption key to terminal 100 making a request for encrypted content 138. A content key kc used to encrypt the requested content is delivered to terminal 100 during a session secured by a session key ks. Encrypted content 148 is delivered by middle box 106 pursuant to identifier (optionally, pseudo-identifier) 148 relayed to it by the server. Middle box 106, having associated identifier (optionally, pseudo-identifier)s with encrypted contents 150, identifies the associated encrypted content and sends it 114 along to terminal 100.

Figure 8:
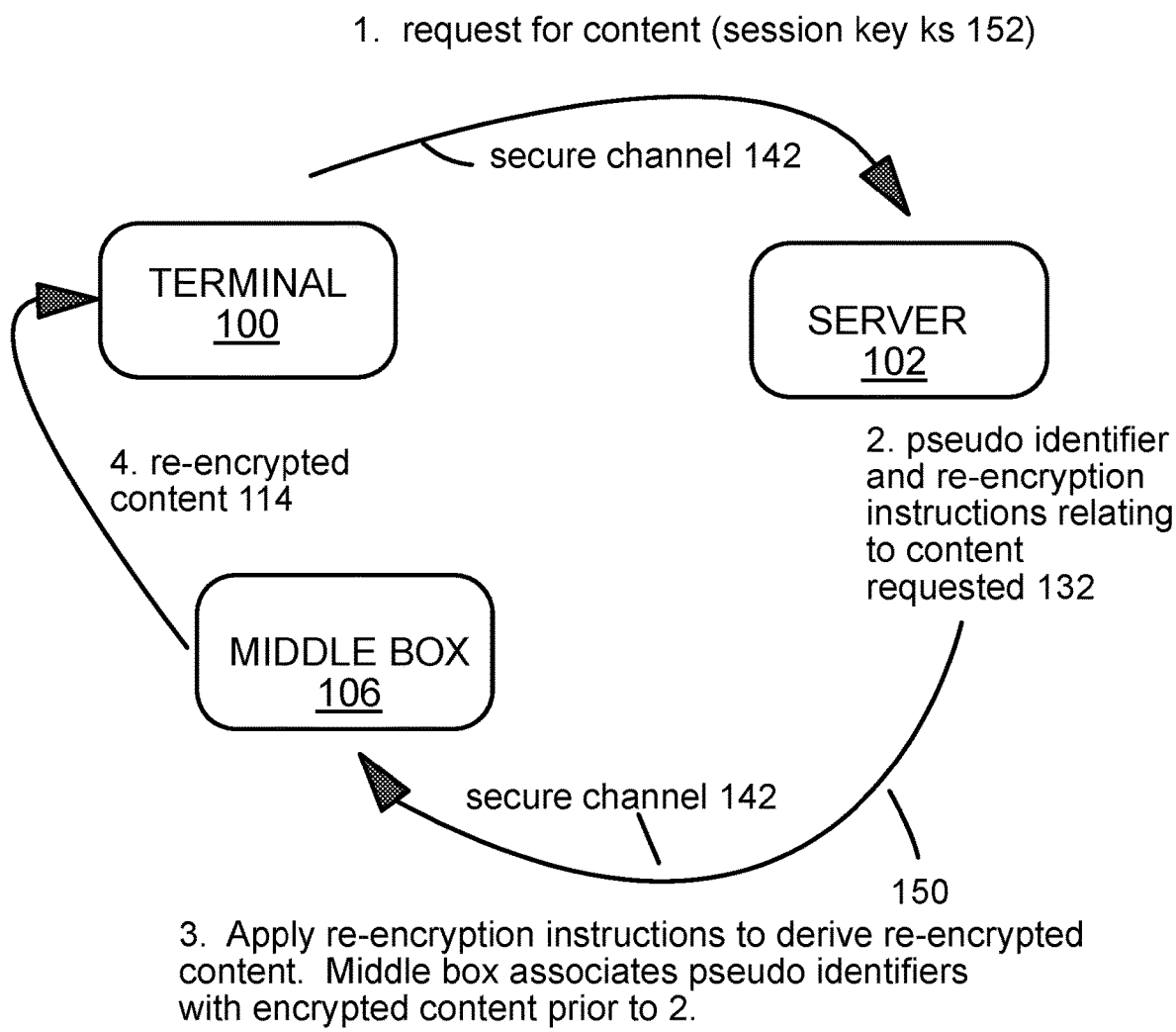
FIG. 8 illustrates the use of a pseudo-identifier related to the content requested to associate with encrypted content and transmitting to a terminal the resulting encrypted content, which may be used in embodiments.

As illustrated in FIG. 8, terminal 100 communicates with server 102 via secure channel 142. Terminal 100 and server 102 use session key ks 152. Additional secured communication channel 142 couples server 102 to middle box 106, which, in turn, is coupled to terminal 102. Terminal 100 transmits to server 102 data including, but not limited to, request for content 152 using a channel secured by the use of a session key ks, e.g., a TLS channel. A simplified approach uses the session key as the content key. The terminal would then use the session key to decrypt encrypted content 114 provided by middle box 106. No re-encryption instructions would be necessary.

Figure 9:
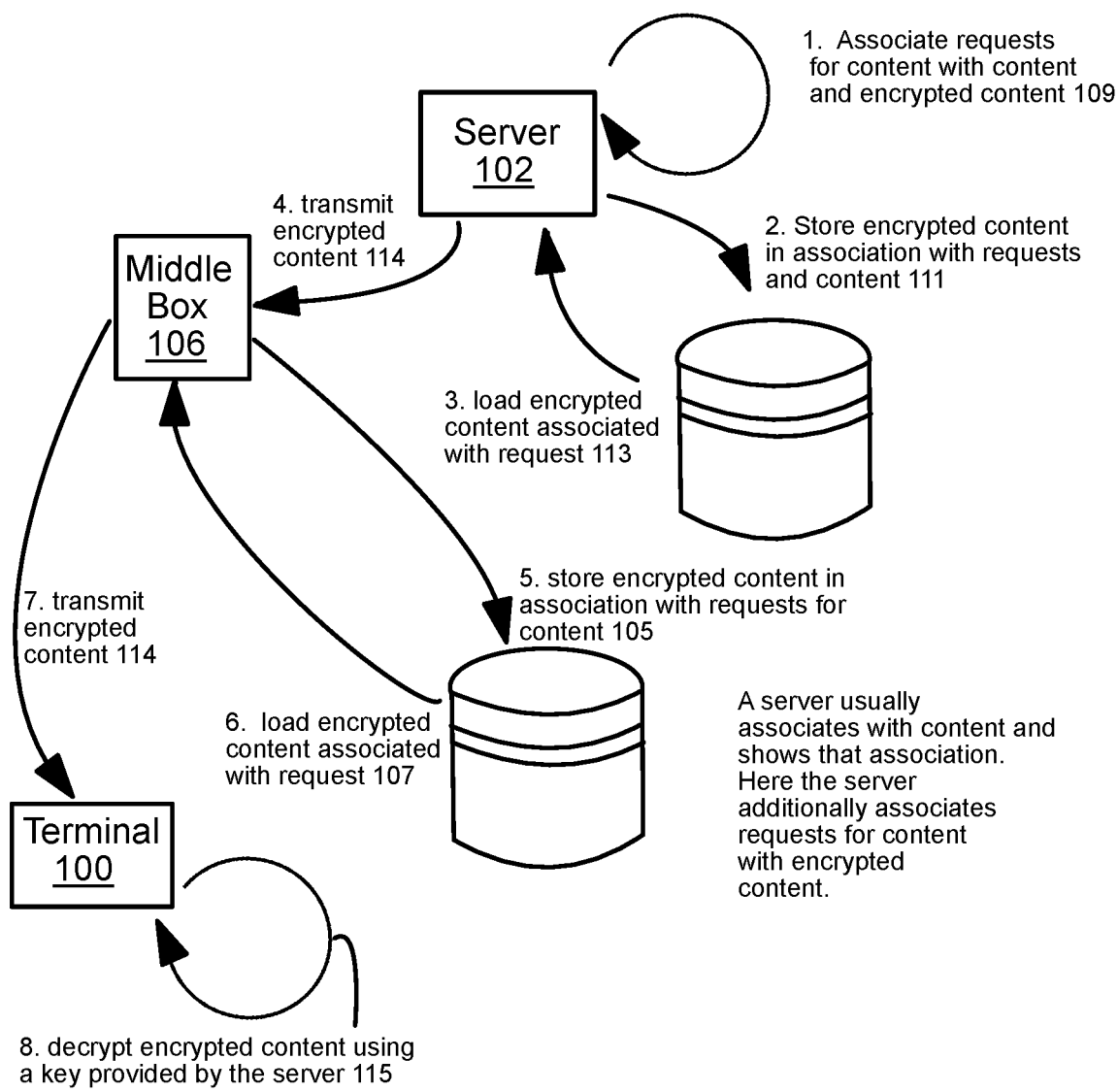
FIG. 9 illustrates storing and loading encrypted content at a middle box and/or a server.

As illustrated in FIG. 9, content can be stored at middle box 106 and/or server 102. Server 102 transmits to middle box 106 data including, but not limited to, encrypted content 114. Middle box 106 having already associated the identifier (optionally, pseudo-identifier) with encrypted content, loads 107 the encrypted content associated with the request. Middle box 106 transmits to terminal 100 data including, but not limited to, the resulting encrypted content. Encrypted content will ultimately be decrypted 115 by terminal 100, using a key provided by server 102.

Figure 10:
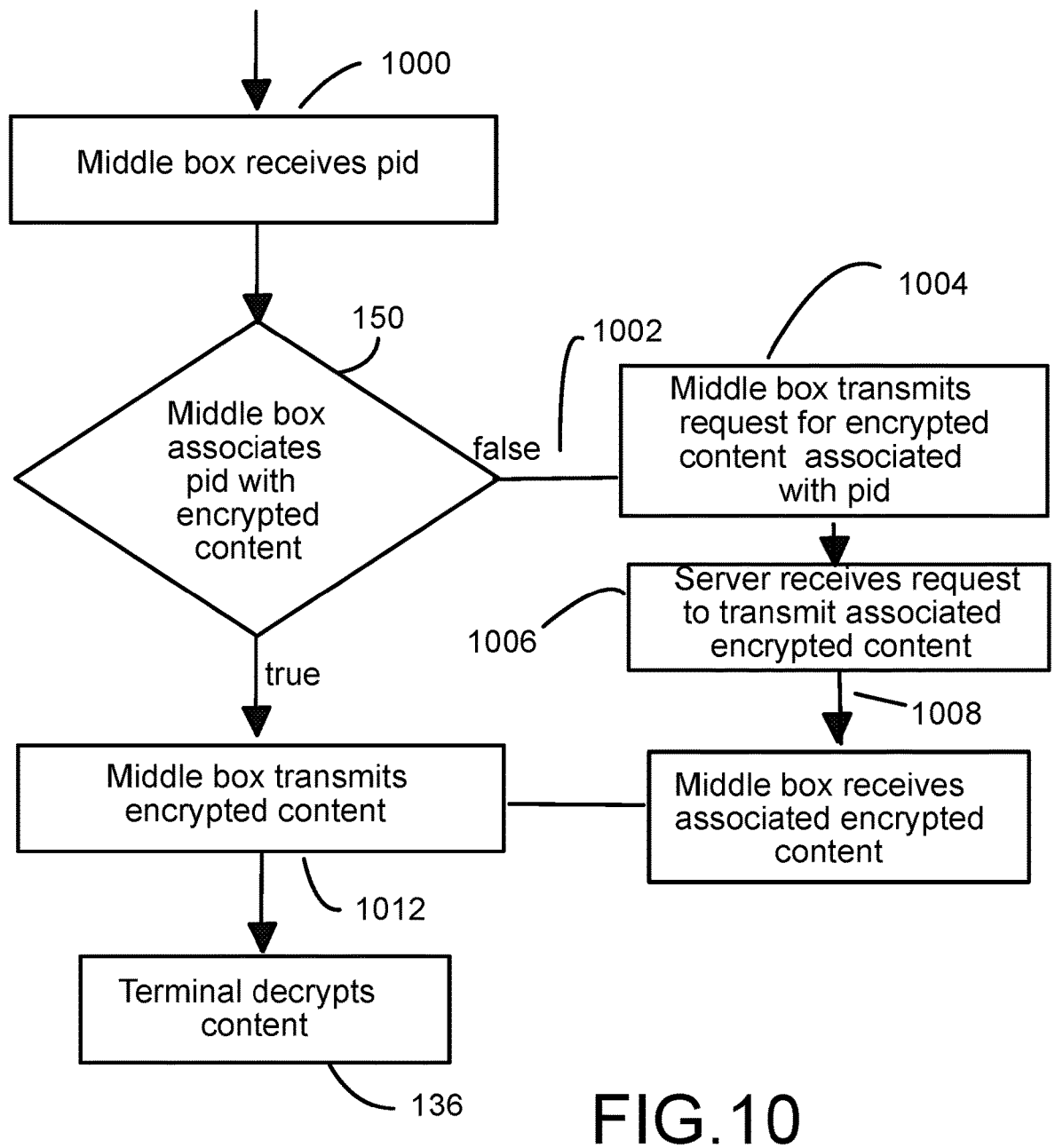
FIG. 10 illustrates the timing and logic of a process at a middle box, which may be used in embodiments.

As illustrated in FIG. 10, timing of the process can start with middle box 106 receiving pseudo-identifier 1000. If middle box 106 is able to associate 1012 the pseudo-identifier with encrypted content 150, then middle box 106 transmits the encrypted content to terminal 100. If middle box 106 is not able to associate 1002 the pseudo-identifier with encrypted content 150, middle box 106 transmits 1004 a request for the associated content to server 102. Server 102 receives a request to transmit 1006 encrypted content. Middle box 106 receives 1008 associated encrypted content. Terminal 100 decrypts 136 associated encrypted content.

Figure 11:
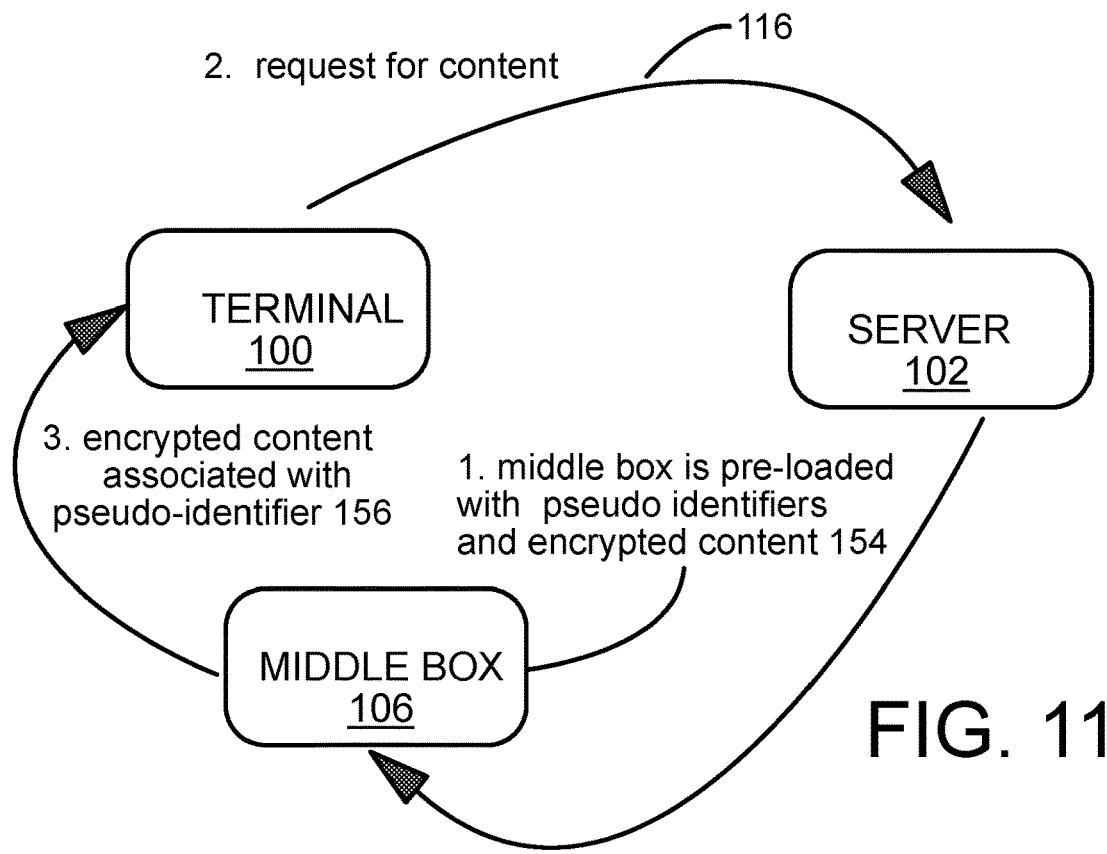
FIG. 11 illustrates an arrangement wherein a middle box is preloaded with associated identifiers and corresponding encrypted before any request for content has been received, which may be used in embodiments.

As illustrated in FIG. 11, middle box 106 is preloaded with associated identifier (optionally, pseudo-identifier)s 154 and corresponding encrypted before any request for content has been received. For example, if its known that potentially popular content will soon be released (e.g. a new video release), the video can be encrypted and associated with a identifier (optionally, pseudo-identifier) before demand surges. Terminal 100 transmits a request for content, server 102 transmits a pseudo-identifier associated with the content, and middle box 106 transmits encrypted content associated with the pseudo-identifier.

Figure 12:
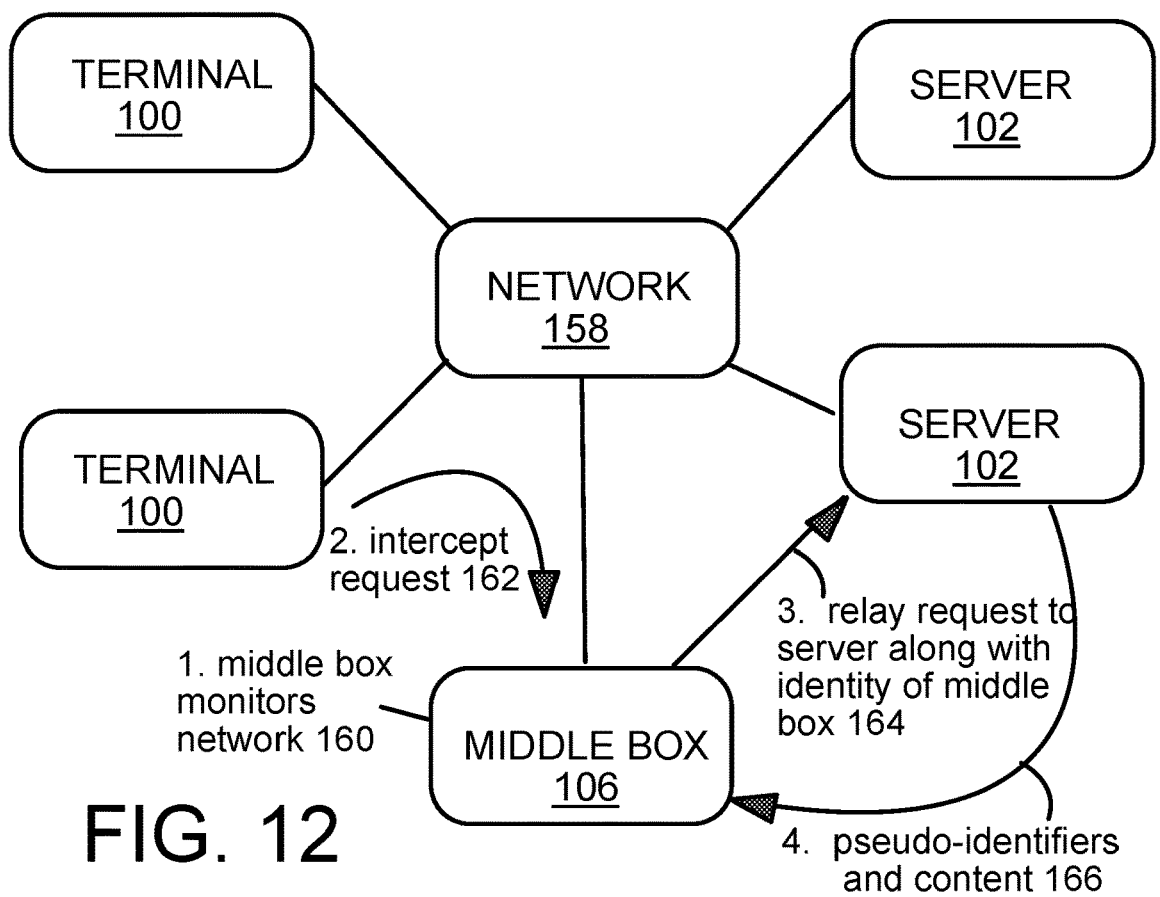
FIG. 12 illustrates a middle box arranged to monitor a network and intercept a terminal's request for content that may be used in embodiments.

As illustrated in FIG. 12, middle box 106 is arranged 160 to monitor a network 158. Terminal 100 can make a request for content, which can be intercepted 162 by middle box 106. Middle box 106 then relays the request 164 to server 102 along with data identifying itself (middle box 106). Server 102 transmits 166 to middle box 106 identifier(s) (optionally, pseudo-identifier)(s) and associated content.

Figure 13:
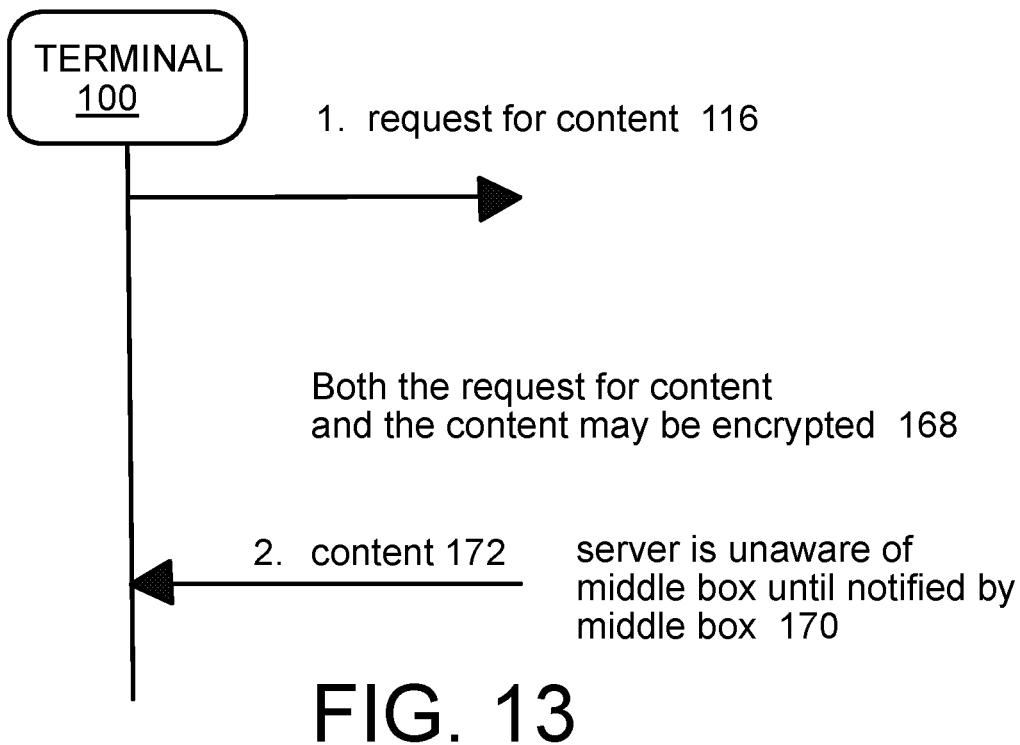
FIG. 13 illustrates an arrangement wherein servers are unaware of a particular middle box that may be used in embodiments that may be used in embodiments.

As illustrated in FIG. 13, above-described embodiments can be arranged so that server 102 is unaware of middle box 106. Server 102 would transmit to middle box 106 only after notification of the existence of middle box 106 by having a request intercepted and a message received from middle box 106 as to the request 168 and the identity of middle box 106. This facilitates transparent caching wherein server 102 is unaware 170 of the cache. In any of the described embodiments a request can be transmitted to server 102 via middle box 106.

Figure 14:
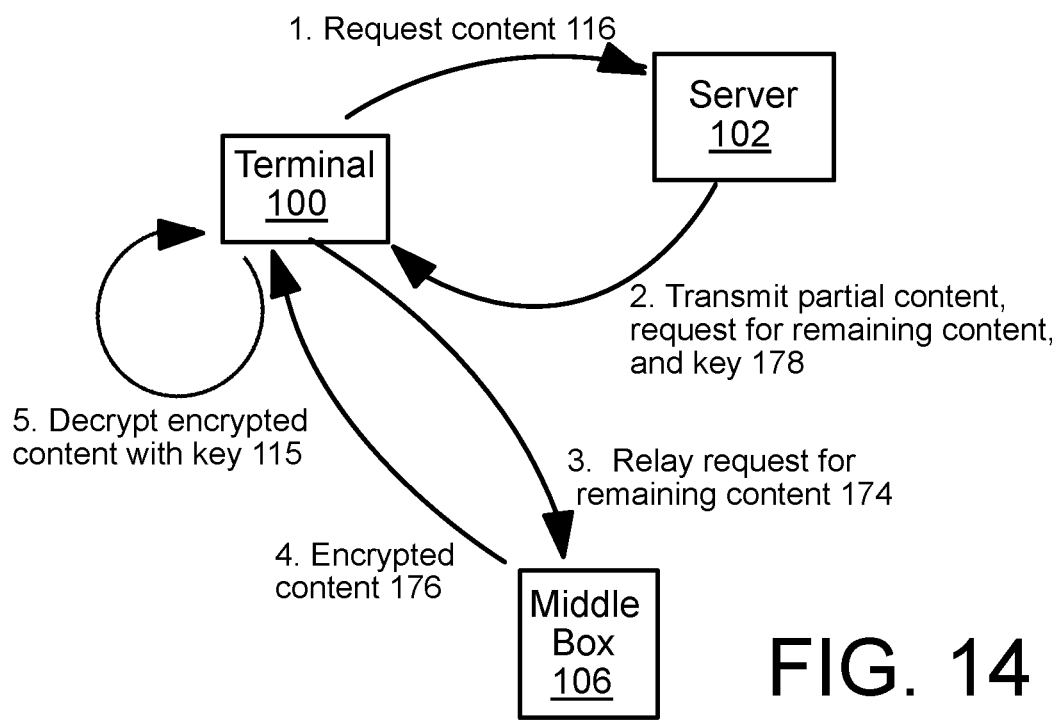
FIG. 14 illustrates receiving partial content from a server, at a terminal, and relaying a request for remaining content to a middle box that may be used in embodiments.

As illustrated in FIG. 14, terminal 100 requests content 116 from server 102. Server 102 transmits 178 partial content, a request for remaining content, and a key. For example, partial content could be the text of a website, and the remaining content could be the images displayed with the text. Terminal 100 relays 174 a request for remaining content to middle box 106. Middle box 106 transmits 176 encrypted content to terminal 100. Terminal 100 decrypts 115 the encrypted content with the key previously provided by server 102.

Figure 15:
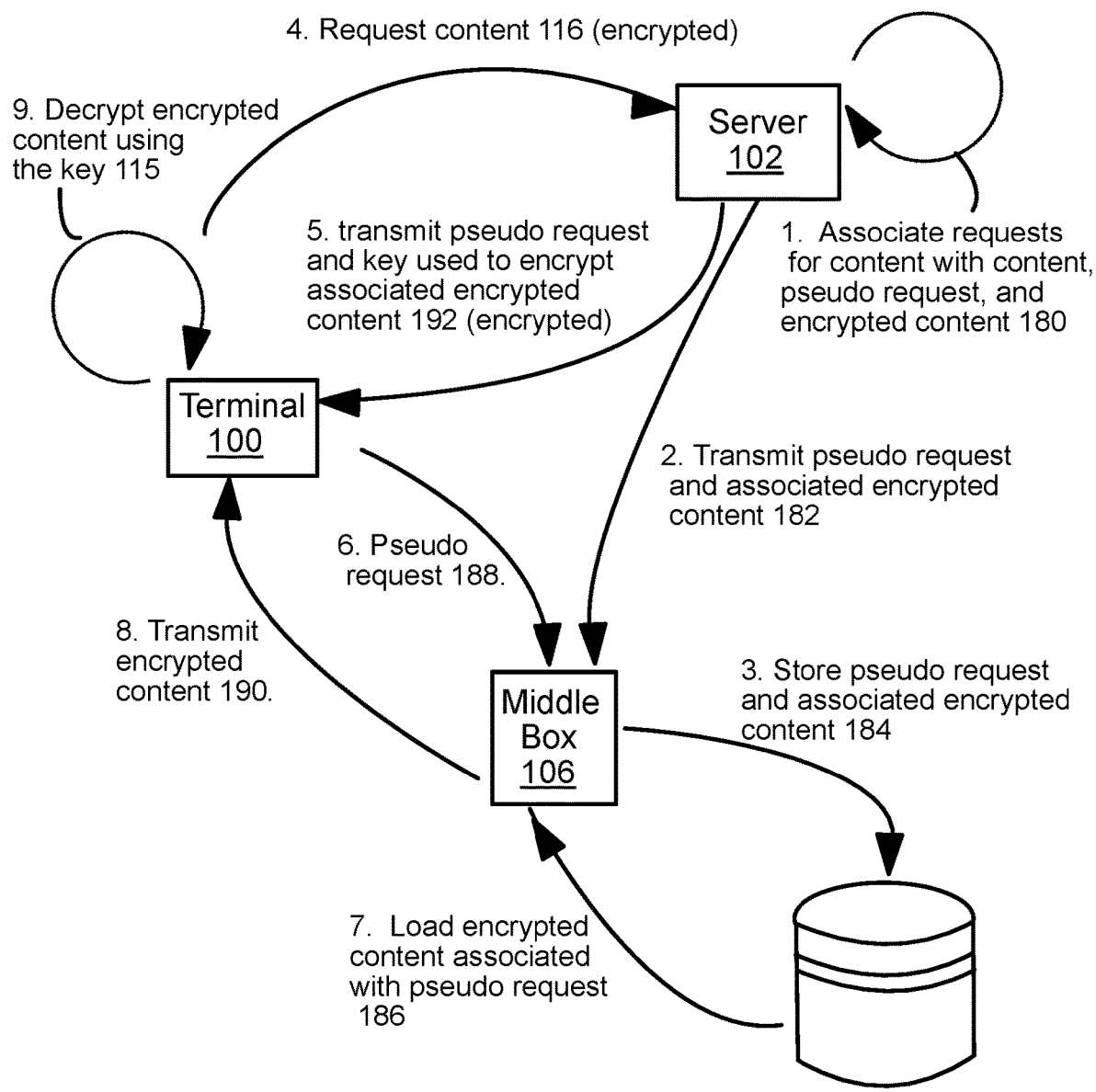
FIG. 15 illustrates receiving a pseudo-request at a terminal, which is then sent to a middle box that may be used in embodiments.

As illustrated in FIG. 15, terminal 100 requests content 116 from server 102. Server 102 associates 180 the request for content with content, a pseudo-request, and encrypted content. Server 102 transmits 182 a pseudo-request and a key to terminal 100. Server 102 transmits 182 a pseudo-request and associated encrypted content to middle box 106. Middle box 106 stores 184 the pseudo request and associated encrypted content. Terminal 100 transmits the pseudo-request to middle box 106. Middle box loads 186 from storage the encrypted content associated with pseudo-request 186. Middle box 106 transmits encrypted content 190. Terminal 100 decrypts 115 the encrypted content using the key previously supplied by server 102.

Figure 16:
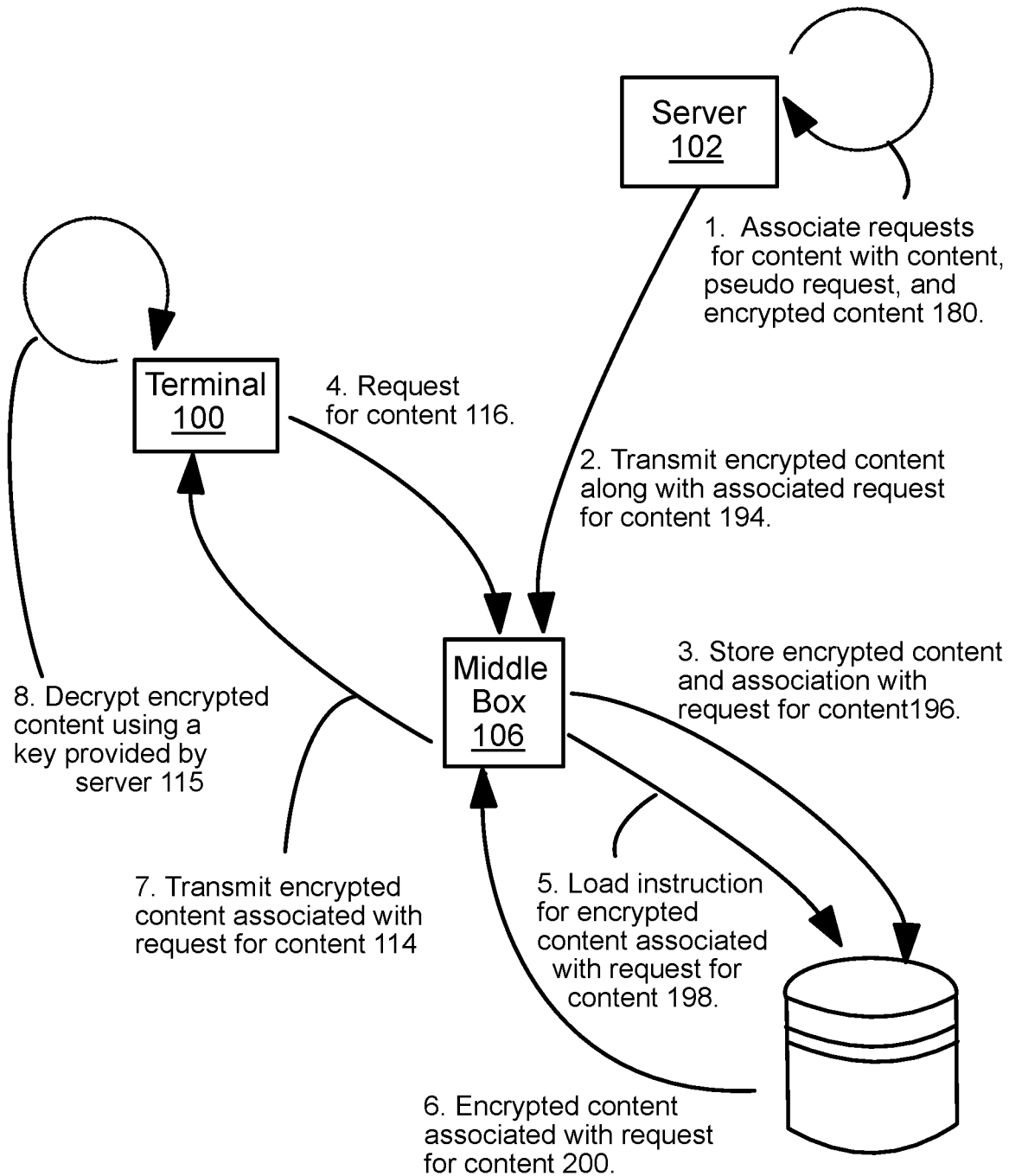
FIG. 16 illustrates sending a request for content from a terminal to a middle box and then receiving encrypted content from the middle box which can be decrypted using a key provided by a server that may be used in embodiments.

As illustrated in FIG. 16, server 102 associates 180 requests for content with contents, pseudo-requests, and encrypted contents. Server 102 transmits 194 to middle box 106 encrypted content along with associated requests for content. Middle box 106 stores 196 encrypted content and their associations with requests for content. Terminal 100 transmits request for content 116 to middle box 106. Middle box 106 loads 198 instructions for associating the request for content with the encrypted content. Middle box 106 loads 200 the encrypted content associated with the request for content received from terminal 100. Middle box 106 transmits 114 encrypted content associated with the request for content. Terminal 100 decrypts 115 encrypted content using a key previously provided by server 102.

Middle box 106 can be connected to various storage apparatuses. Such storage media may comprise non-volatile media and/or volatile media. Non-volatile media includes, for example, optical or magnetic disks. Volatile media includes dynamic memory, such as main memory. Forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Figure 17:
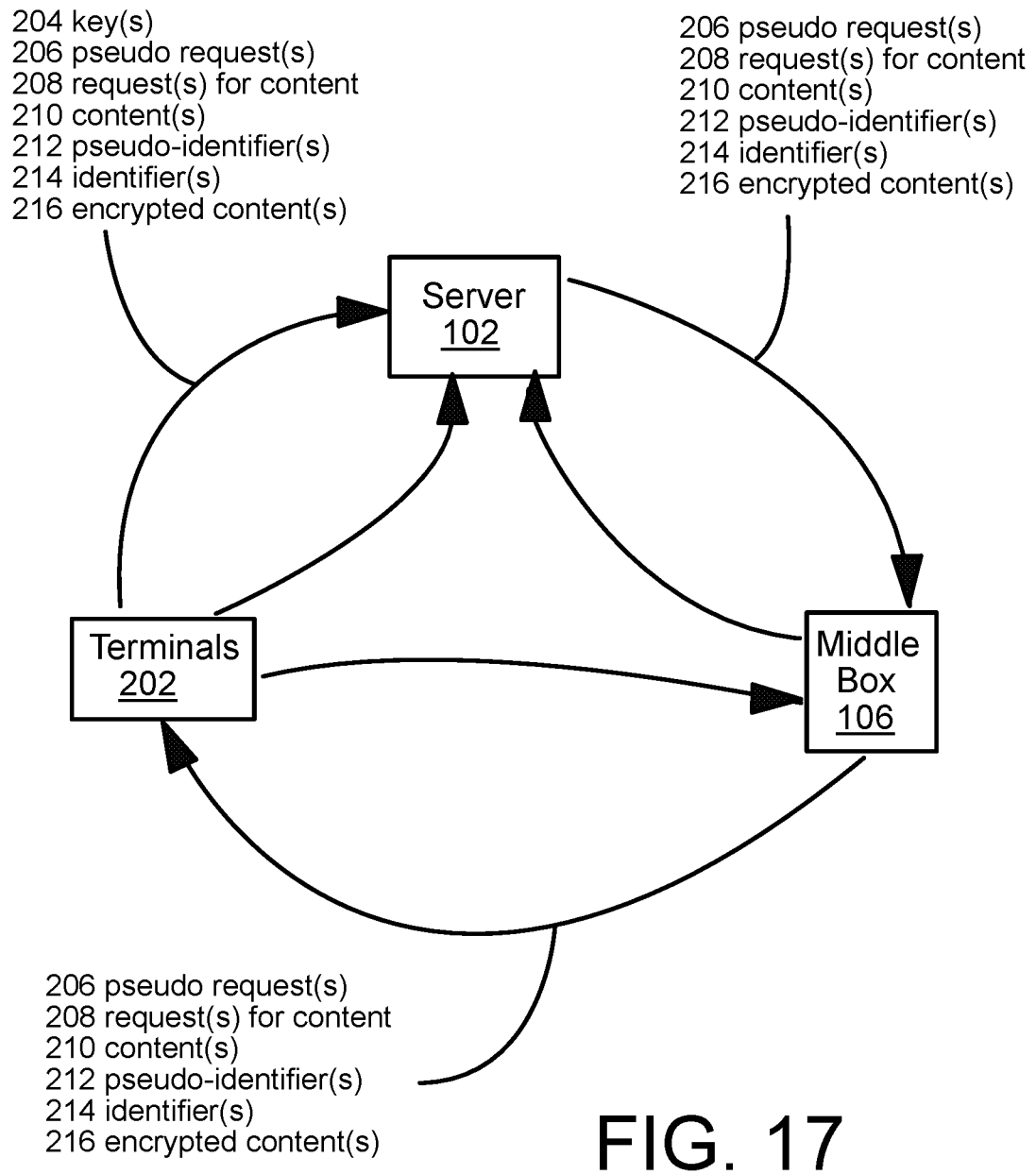
FIG. 17 illustrates the exchange of key(s), pseudo-request(s), request(s) for content, content(s), encrypted content(s), pseudo-identifier(s), and identifier(s) among terminals, server, and middle box that may be used in embodiments.

As illustrated in FIG. 17, server 102 and middle box 106 are communicatively connected to terminals 202. Server 102 and terminals 202 can exchange key(s) 204, pseudo-request(s) 206, request(s) for content 208, content(s) 210, pseudo-identifier(s) 212, identifier(s) 214, and encrypted content(s) 216. Middle box 106 can exchange with or relay to terminals 202 and/or server 102 pseudo-request(s) 206, request(s) for content 208, content(s) 210, pseudo-identifier(s) 212, identifier(s) 214, and encrypted content(s) 216.

Figure 18:
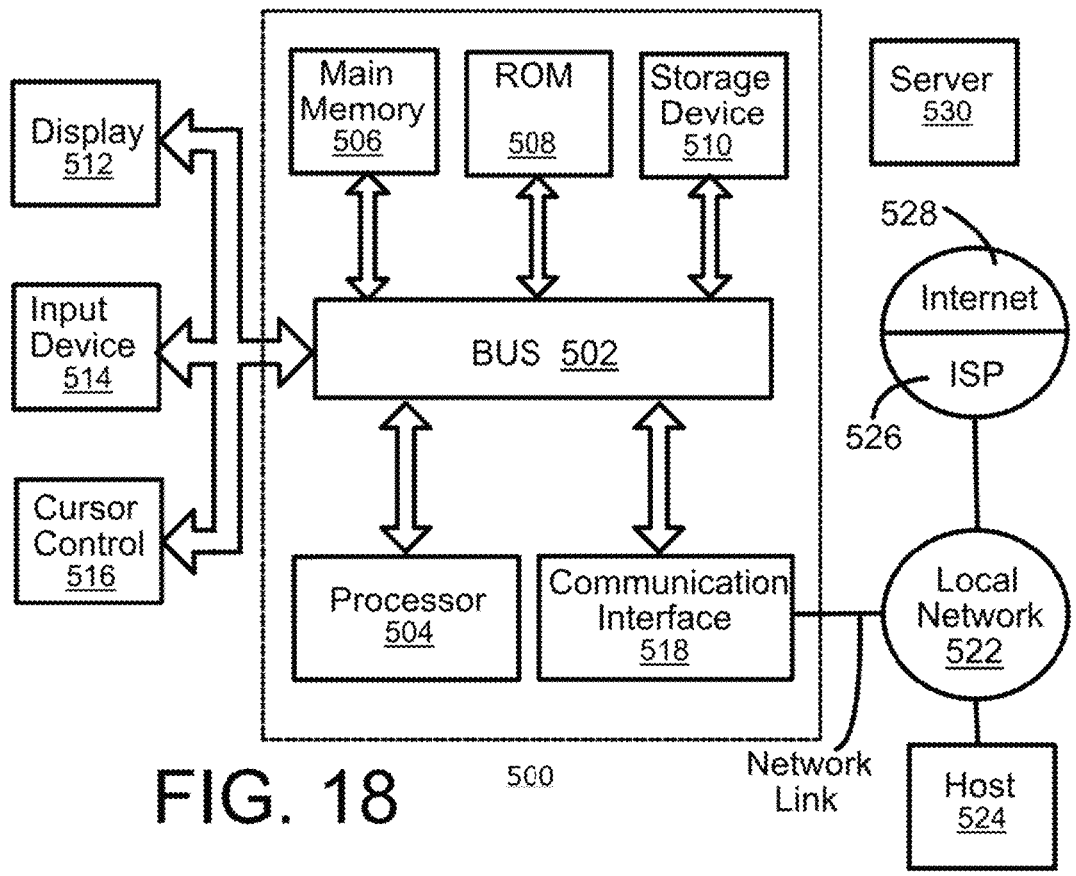
FIG. 18 is a block diagram which illustrates a computer system on which embodiments may be implemented.

As illustrated in FIG. 18, a computer system may be used to implement embodiments. FIG. 18 is a block diagram that illustrates a computer system 500 upon which an embodiment may be implemented. Computer system 500 includes a bus 502 or other communication mechanism for communicating information, and a hardware processor 504 coupled with bus 502 for processing information. Hardware processor 504 may be, for example, a general purpose microprocessor. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions. Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Figure 19:
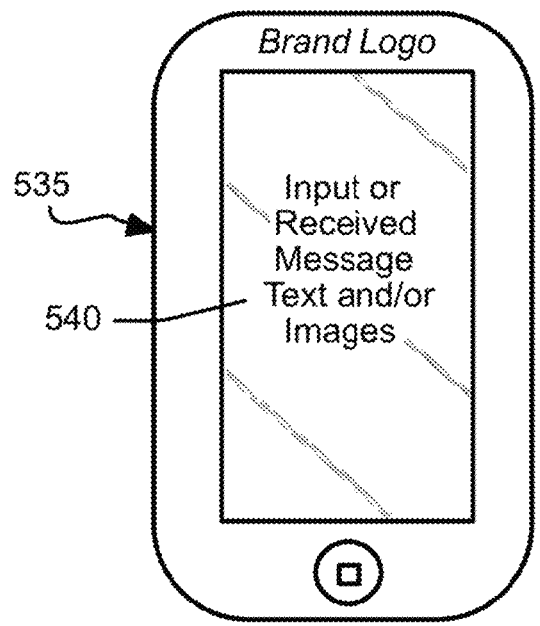
FIG. 19 illustrates a mobile display or touch screen input smart phone or tablet on which embodiments may be implemented.

As illustrated in FIG. 19, a mobile display or touch screen input smart phone or tablet may be used to implement embodiments. In at least one embodiment a device used in accordance with this disclosure is or comprises mobile display or touch screen input smart phone or tablet 535, which is shown displaying direct user-to-device input message text and or image(s), or remotely received message text and/or image(s) 540.

In embodiments, a server and a middle box can be instantiated on an instance of Apache, and a terminal can be instantiated using a web browser, with a maximum transmission unit set to 1500 bytes. Communication commences with a three-way handshake: the terminal sends a TCP packet with sequence number zero and a set SYN flag; the server returns a packet containing sequence number zero, acknowledgement number one, and set SYN & ACK flags; and the terminal sends a pack with sequence number one, acknowledgement one, and a set ACK flag. The terminal makes a HTTP/1.1 GET request. The server acknowledges receipt of the request and delivers a package containing the web page. The terminal acknowledges delivery of the web page, processes the page, and makes a further HTTP/1.1 GET request. The server begins delivery of the requested content with a burst of packets and the terminal acknowledges each of those packets. The server continues delivering bursts until all of the content has been served.

In embodiments, introducing a middle box significantly decreases the time to receive content at the terminal. The roundtrip time between server and terminal could be 50 ms, depending on the location of the server and terminal. Einstein's theory of relativity establishes that the speed of light, approximately 200,000 km/s in optical fiber, is an upperbound on the speed that information can travel. The roundtrip time for communication over fiber between the furthest two points on Earth is approximately 200 ms, since transmission between two antipodal points occurs over roughly a 40,000 km distance. This lower bound is unachievable in practice since it assumes no congestion or fault. A middle box can be located much closer to the terminal, and the round trip time could be 10 ms. A 10 ms terminal to middle box round trip time can cut the time to last byte by half.

In embodiments, middle box 106 associates zero or more identifiers (optionally, pseudo-identifiers) with data including, but not limited to, zero or more pieces of encrypted content. The terminal and server can establish a session key. The terminal encrypts its request for content with session key k and transmits its request to the server. The server receives the terminal's encrypted request for content, and decrypts that encrypted request with the session key to recover the request for content. The encrypted content will ultimately be decrypted by the terminal.

In embodiments, the server transmits to middle box 106 data including, but not limited to, the identifier (optionally, pseudo-identifier) associated with the content. Middle box 106 receives from the server data including, but not limited to, an identifier (optionally, pseudo-identifier). Middle box 106 associates the identifier (optionally, pseudo-identifier) with encrypted content (optionally, pseudo-identifier). Middle box 106 then transmits to the terminal data including, but not limited to, the resulting encrypted content. The terminal receives from middle box 106 data including, but not limited to, encrypted content and decrypts the encrypted content.

In embodiments, caching and encryption can be used to, for example, protect customers' sensitive financial information during interaction with a bank's web application. Developers and manufacturers of equipment and software might wish to protect trade secrets by caching and encrypting their proprietary data. Caching and encryption might also be used for medical information or in any other context where maintaining the confidentiality and security of data is important.

In embodiments, an alternative to the use of a separate content key is for the terminal to use the session key to encrypt content. Other encryption/decryption arrangements can be used as well. For example, proxy re-encryption can be used to transform content encrypted under a key other than the session key to content encrypted under the session key, but we also want to consider other decryption methods. For example, re-encryption instructions might input the encrypted content "enc(s,content)" and output that encrypted content prepended with an encryption of the key used to encrypt that content under the session key "enc(k, $)", and decryption might decrypt the prepended encrypted key using the session key to recover key "s" and use the recovered key to decrypt the encrypted content.

In embodiments, asymmetric keys or symmetric keys can be used. Asymmetric keys use separate keys for encryption and decryption while a symmetric key uses a single key for both processes. The accompanying message and/or data can be sent or received by using a public key, but a private key is used to access the message and/or accompanying data. Asymmetric keys are suited for use for transmitting confidential messages and data. Only the recipient, who holds the public key's corresponding private key, can decode the message. A public key can be sent to a variety of locations, but a private key stays in one location, which keeps it safe from being intercepted during transmission.

In embodiments, the session key generated can be an 8 byte session key and match a pre-defined heuristic (for example all bytes must be modulated as an ASCII digit 0,9 or some other well-defined set of values expressible in each byte). Protocols used to generate keys include but are not limited to Diffie Hellman Key Exchange and RSA. Private keys can be generated using one or more of random data values, a bank of pseudo-random data or non-random data values.

In embodiments, a session key can be generated, at any frequency that is sufficient to achieve the aims of securing the data transmitted by encrypting with a repetitively changing key. For example, a session key can be generated 10 times per second, or 100 times per second.

In embodiments, the server may encrypt content with the same or with distinct keys. Using the same key may be useful to simplify key management, whereas distinct keys may provide better for security (to avoid against "BORE" (Break Once Run Everywhere)).

In embodiments, middle box 106 does not necessarily have to associate a identifier (optionally, pseudo-identifier) with encrypted content. For example, middle box 106 might determine whether to associate the identifier (optionally, pseudo-identifier) with the encrypted content on the basis of whether middle box 106 has recently transmitted re-encryptions of the encrypted content in excess of a particular frequency. Or it might determine that it should associate based on some other condition.

In embodiments, middle box 106 does not necessarily associate the pseudo identifier with encrypted content. When there is no association at middle box 106 between identifier (optionally, pseudo-identifier) and encrypted content, middle box 106 transmits a request to the server for the encrypted content associated with the identifier (optionally, pseudo-identifier). The server receives middle box 106's request for the encrypted content associated with an identifier (optionally, pseudo-identifier), and transmits to middle box 106 the encrypted content associated with the identifier (optionally, pseudo-identifier). Middle box 106 may associate the identifier (optionally, pseudo-identifier) with corresponding encrypted content. In any case where middle box 106 does not have encrypted content that it needs, it can request the encrypted content from the server. The middle box can also be preloaded with encrypted content prior to any request for that content.

In embodiments, the server and middle box can cooperate to render network traffic more efficient. For example, the server can push encrypted content to the middle box prior to expected surges in demand for content, such as for example, just before new content (e.g., a new episode of a popular TV series) is released.

In embodiments, the server may associate content with one or more identifiers (optionally, pseudo-identifiers) and encrypted content before or after receiving a request for content. A middle box can be preloaded with associated identifiers (optionally, pseudo-identifiers) and corresponding encrypted content before any request for content has been received. For example, if it is known that potentially popular content will soon be released (e.g. a video), content can be encrypted and associated with an identifier (optionally, pseudo-identifier) before demand surges. This pre-association can also be applied to the use of re-encryption instruction with or without using identifiers (optionally, pseudo-identifiers).

In embodiments, the server can re-associate content with encrypted content and identifiers (optionally, pseudo-identifiers), wherein the originally associated encrypted content is distinct from the new encrypted content, and the originally associated identifiers (optionally, pseudo-identifiers) are distinct from the new identifiers (optionally, pseudo-identifiers), or both.

In embodiments, originally associated encrypted content and the new encrypted content may be computed using distinct keys. In addition, any of the described embodiments can be modified such that the server re-associates content with encrypted content and identifier (optionally, pseudo-identifier)s, wherein the originally associated encrypted content is distinct from the new encrypted content, and the originally associated identifier (optionally, pseudo-identifier)s are distinct from the new identifier (optionally, pseudo-identifier)s, or both.

In embodiments, a middle box can be arranged to monitor a network and intercept a terminal's request for content in a variety of ways, and can perform a variety of functions. A middle box can include any of a network address translator; a firewall; a traffic shaper; an intrusion detection system; a transparent Web proxy cache; an application accelerator; a virus and/or malware scanner; a parental control filter; and/or a compression proxy.

In embodiments, a secure channel can also be provided between the server and the middle box. Decryption might decrypt the prepended encrypted key using the session key to recover key "s" and use the recovered key to decrypt the encrypted content. The middle box does not necessarily have to associate a identifier (optionally, pseudo-identifier) with encrypted content. For example, the middle box might determine whether to associate the identifier (optionally, pseudo-identifier) with the encrypted content on the basis of whether the middle box has recently transmitted re-encryptions of the encrypted content in excess of a particular frequency. Or it might determine that it should associate based on some other condition.

In embodiments, a network can be arranged so that servers are unaware of a particular middle box. A server would transmit to a particular middle box only after that server had been notified of the existence of that middle box by having a request intercepted and a message received from the middle box as to the request and the identity of the middle box. This facilitates caching wherein the server is unaware of the cache. A request can be transmitted to a server via a middle box which is particularly useful when a communication channel between the terminal and the middle box is more efficient than the communication channel between the terminal and the server. This is the advantage of maintaining cache even when content is encrypted.

In embodiments, the middle box can be provided with the additional function of disassociating one or more identifiers (optionally, pseudo-identifiers) with data including, but not limited to, encrypted content. This feature is particularly useful to remove obsolete associations. For example, a middle box might be programmed to disassociate an identifier (optionally, pseudo-identifier) with its corresponding encrypted content on the basis of whether the middle box has recently transmitted re-encryptions of the encrypted content less than a particular frequency. As another example, disassociation could be based upon how popular content is.

In embodiments, content is associated with encrypted content. A request for that content is received. Re-encryption instructions are associated with the encrypted content and transmitted with the encrypted content. In other words, rather than associate an identifier (optionally, pseudo-identifier) with encrypted content, re-encryption instructions are associated. Encrypted content can be associated with re-encryption instructions before or after receiving a request for content. Relative to flow of encrypted Internet traffic (e.g., over TLS), a performance advantage can be achieved by associating content with encrypted content before receiving a request for content. For example, an advantage is achieved when (a) re-encryption instructions can be applied to encrypted content to derive re-encrypted content, faster than (b) applying encryption instructions (including, but not limited to, instructions defined by TLS) to unencrypted content.

In embodiments, a transmission may encode the recipient and message into a Universal Resource Locator (URL), e.g., the terminal might transmit to the server a request for content using the URL http://server.com/request, where "server.com" is the server's domain and "request" is the terminal's request for content. Moreover, encryption might be used, e.g., https://server.com/request.

System and Digital Communications Network Hardware

Another aspect of the disclosure is a computer system. In embodiments, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques, such as disclosed herein above.

The terms "storage media" and "storage device" as used herein refer to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media and storage device are distinct from but may be used in conjunction with transmission media. Transmission media participates in transferring information between storage media/devices. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In at least one such implementation, communication interface 518 sends and receives one or more of electrical, electromagnetic and optical signals (as with all uses of "one or more" herein implicitly including any combination of one or more of these) that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In at least one embodiment of the Internet example, a server 530 might transmit a requested code for an application program through Internet 528, ISP 526, local network 522 and communication interface 518.

In embodiments, the received code may be one or more of executed by processor 504 as it is received, and/or stored in storage device 510, or other non-volatile storage for later execution.

In embodiments, a device used in accordance with this disclosure is or comprises mobile display or touch screen input smart phone or tablet 535, which is shown displaying direct user-to-device input message text and or image(s), or remotely received message text and/or image(s) 540.

Computer-Readable Medium

Another aspect of the disclosure is one or more computer-readable media (or computer storage apparatus) having a program, which when executed by one or more processors, such part of one or more of the systems described herein, causes the one or more processors to enable, allow or cause devices to perform any one of the methods as variously comprising any one or more of its various embodiments or sub-embodiments described above or otherwise covered by the appended claims.

In embodiments, the one or more computer-readable media are non-transitory media such as, but not limited to HDD and SSD disk drives, thumb and other flash drives, DVDs, CDs, various static and dynamic storage devices and other numerous storage media.

In embodiments, the one or more computer-readable media comprise or are one or more transitory electronic signals.

The following numbered clauses set forth various embodiments of the disclosure:

1. At least one
  (a) computer-implemented method, or
  (b) terminal by way of (i) at least one processor; and at least one memory storing instructions executed by the at least one processor, (ii) means for or (iii) software module(s) for performing operation(s), or
  (c) system by way of (i) at least one processor; and at least one memory storing instructions executed by the at least one processor (ii) means for or (iii) software module(s) for performing operations(s), or
  (d) signal, or
  (e) transitory or non-transitory computer-readable medium containing instructions which when executed by one or more computers each or collectively comprising one or more processors cause operation(s), according to any one or more of the preceding or following clauses, the operation(s) comprising:
  establishing, at a terminal, one or more communication channels coupling the terminal with a server;
  providing one or more key(s) at the server or another device;
  establishing, at the terminal, one or more communication channels coupling the terminal with a middle box;

1.2 A method, terminal, system, signal or, transitory or non-transitory computer-readable medium according to any one or more of the preceding clauses, further comprising communicating the one or more key(s) (optionally, exclusively) to the terminal such that the middle box one or more of (a) is never sent the key(s), (b) never receives the key(s), (c) never receives a usable version of the key(s), (d) never receives an unencrypted version of the key(s), (e) receives (optionally only) version(s) of the key(s) that are encrypted such that the middle box cannot use the key(s) to decrypt content, (f) receives (optionally only) version(s) of the key(s) that are not recognizable by the middle box as being key(s) for decrypting content and (g) never uses the key(s).

1.4 A method, terminal, system, signal or, transitory or non-transitory computer-readable medium according to any one or more of the preceding clauses, further comprising communicating the one or more key(s) (optionally, exclusively) to the terminal such that only the terminal one or more of (a) is sent the key(s), (b) receives the key(s), (c) receives a usable version of the key(s), (d) receives an unencrypted version of the key(s), (e) receives version(s) of the key(s) that are encrypted (optionally such that the middle box cannot use the key(s) to decrypt content), (f) receives a cypher for the decrypting the key(s) and (g) uses the key(s).

1.8 A method, terminal, system, signal or, transitory or non-transitory computer-readable medium according to any one or more of the preceding clauses, further comprising sending, from the terminal, a request for content(s) to the middle box including an identifier(s) or pseudo-identifier(s) associated with an encryption of a content(s); and receiving from the middle box, at the terminal, the encryption of the content associated with the identifier(s) or pseudo-identifier(s).

2. A method, terminal, system, signal or, transitory or non-transitory computer-readable medium according to any one or more of the preceding clauses, further comprising decrypting the encrypted content at the terminal, using the key(s).

3. A method, terminal, system, signal or, transitory or non-transitory computer-readable medium according to any one or more of the preceding clauses, further comprising decrypting the encrypted content at the terminal, using a key from a set of different keys individually distributed at a regular interval.

4. A method, terminal, system, signal or, transitory or non-transitory computer-readable medium according to any one or more of the preceding clauses, further comprising decrypting the encrypted content at the terminal, using a key previously acquired by the terminal.

5. A method, terminal, system, signal or, transitory or non-transitory computer-readable medium according to any one or more of the preceding clauses, further comprising decrypting the encrypted content at the terminal, using a key supplied by another user terminal.

6. A method, terminal, system, signal or, transitory or non-transitory computer-readable medium according to any one or more of the preceding clauses further comprising decrypting at the terminal two or more different encrypted contents using different keys.

7. A method, terminal, system, signal or, transitory or non-transitory computer-readable medium according to any one or more of the preceding clauses further comprising decrypting at the terminal two or more different encrypted contents using the same key.

8. A method, terminal, system, signal or, transitory or non-transitory computer-readable medium according to any one or more of the preceding clauses, wherein the terminal receives encrypted content preloaded at the middle box prior to a request by the terminal for the encrypted content.

9. A method, terminal, system, signal or, transitory or non-transitory computer-readable medium according to any one or more of the preceding clauses, further comprising:

establishing, with the server, a session key at the terminal;
sending, from the terminal, a request for content, encrypted using the session key, the server decrypting the encrypted request using the session key to recover the request for content associated with data including, but not limited to, the identifier(s) or pseudo-identifier(s) and encrypted content;

receiving from the server, at the middle box, the identifier(s) or pseudo-identifier(s) associated with the requested content, the middle box associating the identifier(s) or pseudo-identifier(s) with encrypted content;

transmitting from the middle box to the terminal encrypted content associated with the identifier(s) or pseudo-identifier(s).

10. A method, terminal, system, signal or, transitory or non-transitory computer-readable medium according to any one or more of the preceding clauses, wherein the identifier(s) or pseudo-identifier(s) are sent to the middle box prior to establishing a communication channel between the terminal and the server, the middle box associating the identifier(s) or pseudo-identifier(s) with content(s) or encrypted content(s).

11. A method, terminal, system, signal or, transitory or non-transitory computer-readable medium according to any one or more of the preceding clauses, wherein the terminal sends an encryption of the request for content associated with the encrypted content to one or more of the server and the middle box.

12. A method, terminal, system, signal or, transitory or non-transitory computer-readable medium according to any one or more of the preceding clauses, wherein the terminal receives partial content from the server and instructions to request the remaining content from the middle box 13. A method, terminal, system, signal or, transitory or non-transitory computer-readable medium according to any one or more of the preceding clauses, wherein at least one of the one or more communication channels coupling the terminal with the server are established by operations including, but not limited to:

initiating a TCP channel with the server, at the terminal; and initiating a TLS channel with the server over the initiated TCP channel, at the terminal.

14. A method, terminal, system, signal or, transitory or non-transitory computer-readable medium according to any one or more of the preceding clauses, further comprising:

sending a message from the terminal to the server; and
receiving a certificate at the terminal.

15. A method, terminal, system, signal or, transitory or non-transitory computer-readable medium according to any one or more of the preceding clauses, wherein at least one of the one or more communication channels coupling the terminal with the middle box are established by operations including, but not limited to:

initiating a TCP channel with a middle box, at the terminal; and initiating a TLS channel with the middle box over the initiated TCP channel, at the terminal.

16. A method, terminal, system, signal or, transitory or non-transitory computer-readable medium according to any one or more of the preceding clauses, further comprising:

sending from the terminal to the server an HTTP GET request;

receiving at the terminal a web page in response from the server; and sending from the terminal to the server an acknowledgment of delivery of the webpage.

17. A method, terminal, system, signal or, transitory or non-transitory computer-readable medium according to any one or more of the preceding clauses further comprising the terminal receiving a web page instructing the terminal to request content from the middle box.

18. A method, terminal, system, signal or, transitory or non-transitory computer-readable medium (optionally, according to any one or more of the preceding clauses) for operating an oblivious content distribution network, comprising:
  establishing a communication channel at a terminal with a server;
  establishing a communication channel at a middle box with a server;
  transmitting from the terminal to the server key(s) and one or more of pseudo-request(s), request(s) for content, content(s), pseudo-identifier(s), and encrypted content(s);
  receiving from the server at the terminal key(s) and one or more of pseudo-request(s), request(s) for content, content(s), pseudo-identifier(s), and encrypted content(s);
  receiving at the middle box from the server one or more of pseudo-request(s), request(s) for content, content(s), pseudo-identifier(s), and encrypted content(s); and
  receiving at the terminal from the middle box one or more of pseudo-request(s), request(s) for content, content(s), pseudo-identifier(s), and encrypted content(s).

19. A method, terminal, system, signal or, transitory or non-transitory computer-readable medium according to any one or more of the preceding clauses, wherein content is encrypted under a key other than a session key.

20. A method, terminal, system, signal or, transitory or non-transitory computer-readable medium according to any one or more of the preceding clauses, further comprising:
  intercepting by the middle box, a request to the server for content; and
  relaying, by the middle box to the server, the request for content along with data that identifies the middle box, which data is used to aid transmission to the middle box of an identifier (optionally, pseudo-identifier) associated with the content.

21. A method, terminal, system, signal or, transitory or non-transitory computer-readable medium according to any one or more of the preceding clauses further comprising:
  observing by the middle box a request to the server for encrypted content;
  transmitting by the middle box to the server a notification of the presence of the middle box; and
  receiving from the server at the middle box, after sending notification of its presence, encrypted content requested by the request.

22. A method, terminal, system, signal or, transitory or non-transitory computer-readable medium according to any one or more of the preceding clauses, wherein the middle box comprises one of:
  a network address translator;
  a firewall;
  a traffic shaper;
  an intrusion detection system;
  a transparent Web proxy cache;
  an application accelerator;
  a virus and/or malware scanner;
  a parental control filter; and
  a compression proxy.

23. A method, terminal, system, signal or, transitory or non-transitory computer-readable medium according to any one or more of the preceding clauses, further comprising establishing a communication channel with a first additional middle box between the first additional middle box and the server and between the first additional middle box and the middle box along the communication channel connecting the middle box and the server, wherein the first additional middle box transmits and receives one or more of pseudo-request(s), request(s) for content, content(s), pseudo-identifier(s), and encrypted content(s).

24. A method, terminal, system, signal or, transitory or non-transitory computer-readable medium according to any one or more of the preceding clauses, further comprising establishing a communication channel with a first additional middle box between the first additional middle box and the terminal and between the first additional middle box and the middle box along the communication channel connecting the middle box and the terminal, wherein the first additional middle box transmits and receives one or more of pseudo-request(s), request(s) for content, content(s), pseudo-identifier(s), and encrypted content(s).

25. A method, terminal, system, signal or, transitory or non-transitory computer-readable medium according to any one or more of the preceding clauses, further comprising establishing a communication channel with one or more second additional middle box(es) along the communication channel connecting the middle box with the first additional middle box communicatively connected to the server, wherein the second additional middle box(es) transmit and receive one or more of pseudo-request(s), request(s) for content, content(s), pseudo-identifier(s), and encrypted content(s).

26. A method, terminal, system, signal or, transitory or non-transitory computer-readable medium according to any one or more of the preceding clauses, further comprising establishing a communication channel with one or more second additional middle box(es) along the communication channel connecting the middle box with the first additional middle box communicatively connected to the terminal, wherein the second additional middle box(es) transmit and receive one or more of pseudo-request(s), request(s) for content, content(s), pseudo-identifier(s), and encrypted content(s).

27. A method, terminal, system, signal or, transitory or non-transitory computer-readable medium (optionally, according to any one or more of the preceding clauses), at one or more terminal(s), comprising:
  sending a request for encrypted content, the request including or accompanied simultaneously, before or after, by instructions causing communication between at least one server and at least one middle box, wherein one or more of the at least one server and the at least one middle box, indirectly or directly, cause(s):
    (1) association of the encrypted content with an identifier(s) or pseudo-identifier(s),
    (2) encryption of the content; and
  receiving the encrypted content associated with the identifier.

28. A method, terminal, system, signal or, transitory or non-transitory computer-readable medium (optionally, according to any one or more of the preceding clauses), comprising:
  an oblivious content distribution network comprising:
    at least one terminal arranged to transmit, receive, or both key(s) and one or more of pseudo-request(s), request(s) for content, content(s), pseudo-identifier(s), and encrypted content(s);
    a server arranged to transmit, receive, or both key(s) and one or more of pseudo-request(s), request(s) for content, content(s), pseudo-identifier(s), and encrypted content(s); and at least one middle box arranged to transmit, receive, or both one or more of pseudo-request(s), request(s) for content, content(s), pseudo-identifier(s), and encrypted content(s).

29. A method, terminal, system, signal or, transitory or non-transitory computer-readable medium according to any one or more of the preceding clauses, wherein at least one of the one or more communication channels coupling the terminal with the server are established by operations including, but not limited to:
    establishing a TCP channel with the server, at the terminal, and
    overlaying a TLS channel with the server.

30. A method, terminal, system, signal or, transitory or non-transitory computer-readable medium according to any one or more of the preceding clauses, wherein at least one of the one or more communication channels coupling the terminal with the middle box are established by operations including, but not limited to:
    establishing a TCP channel with the middle box, at the terminal, and
    overlaying a TLS channel with the middle box.

31. A method, terminal, system, signal or, transitory or non-transitory computer-readable medium (optionally. according to any one or more of the preceding clauses), further comprising:
    wherein the middle box re-encrypts requested content and re-encryption instructions are in the form of a function.

32. A method, terminal, system, signal or, transitory or non-transitory computer-readable medium (optionally. according to any one or more of the preceding clauses), further comprising:
    wherein the middle box re-encrypts requested content and re-encryption instructions are in the form of an algorithm.

33. A method, terminal, system, signal or, transitory or non-transitory computer-readable medium (optionally. according to any one or more of the preceding clauses), further comprising:
    establishing a session key between a client and a server;
    receiving, at the server, a request for content, the request being encrypted using the session key;
    decrypting, by the server, the encrypted request for content using the session key to recover the request for content;
    the server associating content with one or more identifier (optionally, pseudo-identifier)s and encrypted content;
    sending from the server to a middle box, a identifier (optionally, pseudo-identifier) associated with the requested content, the middle box associating the identifier (optionally, pseudo-identifier) with encrypted content;
    sending from the server to the middle box, re-encryption instructions for re-encrypting the encrypted content provided by the server;
    re-encrypting, according to the re-encrypting instructions, by the middle box, the encrypted content; and
    sending the re-encrypted content to the client.

34. A method, terminal, system, signal or, transitory or non-transitory computer-readable medium (optionally. according to any one or more of the preceding clauses), further comprising:
    wherein the server sends content and re-encryption instructions together to the middle box.

35. A method, terminal, system, signal or, transitory or non-transitory computer-readable medium (optionally. according to any one or more of the preceding clauses), further comprising:
    wherein the server sends content and re-encryption instructions separately to the middle box.

36. A method, terminal, system, signal or, transitory or non-transitory computer-readable medium (optionally. according to any one or more of the preceding clauses), further comprising:
    wherein the server sends re-encryption instructions to the middle box after it sends the content to the middle box.

37. A method, terminal, system, signal or, transitory or non-transitory computer-readable medium (optionally. according to any one or more of the preceding clauses), further comprising:
    sending, via a secure channel, from a client to a server, a request for content, the server associating content with a(n) identifier (optionally, pseudo-identifier) and encrypted content;
    computing, at the server, re-encryption instructions with respect to a key used by the secure channel, the encrypted content associated with the content, the key used to encrypt that encrypted content, or a second key, such that applying the re-encryption instructions to the encrypted content results in re-encrypted content that can be decrypted by the client; and
    sending, from the server to a middle box, data including a(n) identifier (optionally, pseudo-identifier) and encrypted content associated with the requested content, the middle box associating the identifier (optionally, pseudo-identifier) with encrypted content; and
    sending, from the middle box to the client, encrypted content corresponding to the identifier (optionally, pseudo-identifier), the client receiving from the middle box, re-encrypted content.

38. A method, terminal, system, signal or, transitory or non-transitory computer-readable medium (optionally. according to any one or more of the preceding clauses), wherein the client decrypts the re-encrypted content.

39. A method, terminal, system, signal or, transitory or non-transitory computer-readable medium (optionally. according to any one or more of the preceding clauses), further comprising:
    wherein the client uses the key used to protect the secure channel to decrypt the re-encrypted content.

40. A method, terminal, system, signal or, transitory or non-transitory computer-readable medium (optionally. according to any one or more of the preceding clauses), further comprising:
    sending, from a client to a server, a session key encrypted request for content;
    decrypting, by the server using the session key, the encrypted request for content to recover the request for content;
    the server associating content with a(n) identifier (optionally, pseudo-identifier) and encrypted content (or optionally "an encryption of the content");
    computing, by the server, re-encryption instructions with respect to one or more of the session key, the encrypted content (or "the encryption of the content") associated with the content, the key used to encrypt that encrypted content (or "the encryption of the content"), or some other key, such that applying the re-encryption instructions to the encrypted content (or "the encryption of the content") associated with the content results in re-encrypted content that can be decrypted by the client; and sending, by the server to a middle box, a(n) identifier (optionally, pseudo-identifier) associated with the requested content and the re-encryption instructions, the middle box receiving, from the server, the identifier (optionally, pseudo-identifier) and re-encryption instructions, wherein the middle box has previously associated the identifier (optionally, pseudo-identifier) with encrypted content;

applying, by the middle box, the re-encryption instructions to the encrypted content (or "the encryption of the content") associated with the identifier (optionally, pseudo-identifier);

transmitting by the middle box to the client, re-encrypted content; and receiving by the client from the middle box, the re-encrypted content and decrypting the re-encrypted content.

41. A method, terminal, system, signal or, transitory or non-transitory computer-readable medium (optionally. according to any one or more of the preceding clauses), further comprising:
wherein the identifier (optionally, pseudo-identifier) and re-encryption instructions are sent at different times.

42. A method, terminal, system, signal or, transitory or non-transitory computer-readable medium (optionally. according to any one or more of the preceding clauses), further comprising:
wherein the identifier (optionally, pseudo-identifier) and re-encryption instructions are sent at the same time.

43. A method, terminal, system, signal or, transitory or non-transitory computer-readable medium (optionally. according to any one or more of the preceding clauses), further comprising:
wherein the client uses the session key to decrypt the re-encrypted content.

44. A method, terminal, system, signal or, transitory or non-transitory computer-readable medium (optionally. according to any one or more of the preceding clauses), further comprising:
sending, from a client to a server, a session key encrypted request for content,
decrypting, by the server, the encrypted request for content to recover the request for content;
the server associating content with a identifier (optionally, pseudo-identifier) and encrypted content;
computing, by the server, re-encryption instructions for the content;
sending, by the server to a middle box, a identifier (optionally, pseudo-identifier) associated with the requested content and the re-encryption instructions, the middle box receiving, from the server the identifier (optionally, pseudo-identifier) and re-encryption instructions, wherein the middle box has previously associated the identifier (optionally, pseudo-identifier) with encrypted content; and
applying, by the middle box, the re-encryption instructions to the encrypted content associated with the identifier (optionally, pseudo-identifier);
transmitting by the middle box to the client, re-encrypted content; and
receiving by the client from the middle box, the re-encrypted content and decrypting the re-encrypted content.

45. A method, terminal, system, signal or, transitory or non-transitory computer-readable medium (optionally. according to any one or more of the preceding clauses), further comprising:
wherein proxy re-encryption is used to transform content encrypted under a key other than the session key to content encrypted under the session key.

46. A method, terminal, system, signal or, transitory or non-transitory computer-readable medium (optionally. according to any one or more of the preceding clauses), further comprising:
wherein re-encryption instructions input the encrypted content "enc(s,content)" and output that encrypted content prepended with an encryption of the key used to encrypt that content under the session key "enc(k,$)", and decryption decrypts the prepended encrypted key using the session key to recover key "s" and uses the recovered key to decrypt the encrypted content.

47. A method, terminal, system, signal or, transitory or non-transitory computer-readable medium (optionally. according to any one or more of the preceding clauses), further comprising:
wherein the middle box determines whether to associate the identifier (optionally, pseudo-identifier) with the encrypted content on the basis of whether the middle box has recently transmitted re-encryptions of the encrypted content in excess of a particular frequency.

48. A method, terminal, system, signal or, transitory or non-transitory computer-readable medium (optionally. according to any one or more of the preceding clauses), further comprising:
receiving at a server a request for content;
sending from the server to a middle box a identifier (optionally, pseudo-identifier) and re-encryption instructions, wherein the middle box does not associate the identifier (optionally, pseudo-identifier) with encrypted content; and
transmitting to the server, a request for the encrypted content associated with the identifier (optionally, pseudo-identifier);
receiving by the server a middle box request for encrypted content associated with a identifier (optionally, pseudo-identifier);
transmitting to the middle box encrypted content associated with the identifier (optionally, pseudo-identifier); and
receiving at the middle box from the server encrypted content associated with the identifier (optionally, pseudo-identifier);
applying at the middle box re-encryption instructions to the encrypted content;
transmitting from the middle box to the client the re-encrypted content.

49. A method, terminal, system, signal or, transitory or non-transitory computer-readable medium (optionally. according to any one or more of the preceding clauses), further comprising:
receiving at a server a request for content;
associating at the server content with identifier (optionally, pseudo-identifier)s and encrypted content before or after receiving a request for content;
sending content, re-encryption instructions and pseudo identifiers from the server to a middle box; and
associating, at the middle box, identifier (optionally, pseudo-identifier)s with encrypted content before or after receiving those identifier (optionally, pseudo-identifier)s coupled with re-encryption instructions.

50. A method, terminal, system, signal or, transitory or non-transitory computer-readable medium (optionally. according to any one or more of the preceding clauses), further comprising:
the server re-associating content with data including, but not limited to, encrypted content and identifier (optionally, pseudo-identifier)s, wherein the originally associated encrypted content is distinct from the new encrypted content, the originally associated identifier (optionally, pseudo-identifier)s are distinct from the new identifier (optionally, pseudo-identifier)s, or both.

51. A method, terminal, system, signal or, transitory or non-transitory computer-readable medium (optionally. according to any one or more of the preceding clauses), further comprising:
wherein originally associated encrypted content and the new encrypted content are computed using distinct keys.

52. A method, terminal, system, signal or, transitory or non-transitory computer-readable medium (optionally. according to any one or more of the preceding clauses), further comprising:
a server for serving content in response to a client request, the server providing a identifier (optionally, pseudo-identifier) and encrypted content;
a middle box arranged to receive identifier (optionally, pseudo-identifier)s and encrypted content from the server and pass along encrypted content to a client in response to its request, the middle box also being arranged to disassociate one or more identifier (optionally, pseudo-identifier)s with data including, but not limited to, encrypted content.

53. A method, terminal, system, signal or, transitory or non-transitory computer-readable medium (optionally. according to any one or more of the preceding clauses), further comprising:
wherein the middle box disassociates
identifier (optionally, pseudo-identifier)s with encrypted content on the basis of whether the middle box has recently
transmitted re-encryptions of the encrypted content less than a particular frequency.

54. A method, terminal, system, signal or, transitory or non-transitory computer-readable medium (optionally. according to any one or more of the preceding clauses), further comprising:
associating content with encrypted content;
receiving a request for content;
applying re-encryption instructions to the encrypted content associated with the content to create re-encrypted content; and
transmitting the re-encrypted content.

55. A method, terminal, system, signal or, transitory or non-transitory computer-readable medium (optionally. according to any one or more of the preceding clauses), further comprising:
wherein content is associated with encrypted content before or after receiving a request for content.

56. A method, terminal, system, signal or, transitory or non-transitory computer-readable medium (optionally. according to any one or more of the preceding clauses), further comprising:
transmitting the request for content; and
receiving the re-encrypted content.

57. A method, terminal, system, signal or, transitory or non-transitory computer-readable medium (optionally. according to any one or more of the preceding clauses), wherein the pseudo-identifier(s) or identifier(s) are an identifier(s).

58. A method, terminal, system, signal or, transitory or non-transitory computer-readable medium (optionally. according to any one or more of the preceding clauses), wherein the pseudo-identifier(s) or identifier(s) are a pseudo-identifier(s).

59. A method, terminal, system, signal or, transitory or non-transitory computer-readable medium (optionally. according to any one or more of the preceding clauses), wherein the terminal(s) and server(s) form a source-to-end-recipient bipolar device pairing, wherein the keys generated at either pole of the device pairing are sent only directly to each pole of the pairing.

60. A method, terminal, system, signal or, transitory or non-transitory computer-readable medium (optionally. according to any one or more of the preceding clauses), wherein the key(s) generated by the server(s) or terminal(s) are shared only with a respective opposing server if a terminal-generated key is sent, or with a respective opposing terminal if a server generated key is sent.

Embodiments can work with software, hardware, and/or operating system implementations other than those described herein. Any software, hardware, and operating system implementations suitable for performing the functions described herein can be used. Embodiments are applicable to a terminal, to a middle box, to a server or any combination of the three.

While it is apparent that the illustrative embodiments of the disclosure herein fulfil one or more objectives or inventive solutions, it is appreciated that numerous modifications and other embodiments may be devised by those skilled in the art. Additionally, feature(s) and/or element(s) from any embodiment may be used singly or in combination with other embodiment(s). Therefore, it will be understood that the appended claims are intended to cover all such modifications and embodiments that would come within the spirit and scope of the present disclosure.

The above embodiments are to be understood as illustrative examples of the disclosure. Further embodiments of the disclosure are envisaged. It is to be understood that any feature described in relation to any one or one set of embodiments may be used alone, or in combination with other features described, and may also be used in combination with one or more features of any other of the embodiments, or any combination of any other of the embodiments. Furthermore, equivalents and modifications not described above may also be employed without departing from the scope of the disclosure, which is defined in the accompanying claims.

What is claimed is:
1. A method, comprising:
establishing, at a terminal, one or more communication channels coupling the terminal with a server;
providing one or more key(s) at the server or another device;
establishing, at the terminal, one or more communication channels coupling the terminal with a middle box;
communicating the one or more key(s) to the terminal such that only the terminal one or more of (a) is sent the key(s), (b) receives the key(s), (c) receives a usable version of the key(s), (d) receives an unencrypted version of the key(s), (e) receives version(s) of the key(s) that are encrypted (optionally such that the middle box cannot use the key(s) to decrypt content), (f) receives a cypher for the decrypting the key(s) and (g) uses the key(s);

sending, from the terminal, a request for content(s) to the middle box including an identifier(s) or pseudo-identifier(s) associated with an encryption of a content(s);

receiving from the middle box, at the terminal, the encryption of the content associated with the identifier(s) or pseudo-identifier(s);

establishing a communication channel with a first additional middle box between the first additional middle box and the terminal and between the first additional middle box and the middle box along the communication channel connecting the middle box and the terminal, wherein the first additional middle box transmits and receives one or more of pseudo-request(s), request(s) for content, content(s), pseudo-identifier(s), and encrypted content(s); and establishing a communication channel with one or more second additional middle box(es) along the communication channel connecting the middle box with the first additional middle box communicatively connected to the terminal, wherein the second additional middle box(es) transmit and receive one or more of pseudo-request(s), request(s) for content, content(s), pseudo-identifier(s), and encrypted content(s).

2. The method according to claim 1, further comprising decrypting the encrypted content at the terminal, using the key(s).

3. The method according to claim 1, further comprising decrypting the encrypted content at the terminal, using a key from a set of different keys individually distributed at a regular interval.

4. The method according to claim 1, further comprising decrypting the encrypted content at the terminal, using a key previously acquired by the terminal.

5. The method according to claim 1, further comprising decrypting the encrypted content at the terminal, using a key supplied by another user terminal.

6. The method according to claim 1, further comprising decrypting at the terminal two or more different encrypted contents using different keys or the same key.

7. The method according to claim 1, further comprising decrypting at the terminal two or more different encrypted contents using the same key.

8. The method according to claim 1, wherein the terminal receives encrypted content preloaded at the middle box prior to a request by the terminal for the encrypted content.

9. The method according to claim 1, further comprising:
establishing, with the server, a session key at the terminal;
sending, from the terminal, a request for content, encrypted using the session key, the server decrypting the encrypted request using the session key to recover the request for content associated with data including, but not limited to, the identifier(s) or pseudo-identifier(s) and encrypted content;
receiving from the server, at the middle box, the identifier(s) or pseudo-identifier(s) associated with the requested content, the middle box associating the identifier(s) or pseudo-identifier(s) with encrypted content;
transmitting from the middle box to the terminal encrypted content associated with the identifier(s) or pseudo-identifier(s).

10. The method according to claim 1, wherein the identifier(s) or pseudo-identifier(s) are sent to the middle box prior to establishing a communication channel between the terminal and the server, the middle box associating the identifier(s) or pseudo-identifier(s) with content(s) or encrypted content(s).

11. The method according to claim 1, wherein the terminal sends an encryption of the request for content associated with the encrypted content to one or more of the server and the middle box.

12. The method according to claim 1, wherein the terminal receives partial content from the server and instructions to request the remaining content from the middle box.

13. The method according to claim 1, wherein at least one of the one or more communication channels coupling the terminal with the server are established by operations including, but not limited to:
initiating a Transmission Control Protocol channel with the server, at the terminal; and
initiating a Transport Layer Security channel with the server over the initiated Transmission Control Protocol channel, at the terminal.

14. The method according to claim 1, further comprising:
sending a message from the terminal to the server; and
receiving a certificate at the terminal.

15. The method according to claim 1, wherein at least one of the one or more communication channels coupling the terminal with the middle box are established by operations including, but not limited to:
initiating a Transmission Control Protocol channel with the middle box, at the terminal; and
initiating a Transport Layer Security channel with the middle box over the initiated Transmission Control Protocol channel, at the terminal.

16. The method according to claim 1, further comprising:
sending from the terminal to the server an Hypertext Transfer Protocol GET request;
receiving at the terminal a web page in response from the server; and
sending from the terminal to the server an acknowledgment of delivery of the webpage.

17. The method according to claim 1, further comprising the terminal receiving a web page instructing the terminal to request content from the middle box.

18. The method according to claim 1, wherein the terminal(s) and server(s) form a source-to-end-recipient bipolar device pairing, wherein the keys generated at either pole of the device pairing are sent only directly to each pole of the pairing.

19. The method according to claim 1, wherein the key(s) generated by the server(s) or terminal(s) are shared only with a respective opposing server if a terminal-generated key is sent, or with a respective opposing terminal if a server generated key is sent.

20. A method for operating an oblivious content distribution network, comprising:
establishing, at a terminal, a communication channel with a server;
establishing, at a middle box, a communication channel with the server;
receiving, from the server at the terminal, key(s) and one or more of pseudo-request(s), request(s) for content, content(s), pseudo-identifier(s), and encrypted content(s);
transmitting, from the terminal to the server, key(s) and one or more of pseudo-request(s), request(s) for content, content(s), pseudo-identifier(s), and encrypted content(s);

receiving, at the middle box from the server, one or more of pseudo-request(s), request(s) for content, content(s), pseudo-identifier(s), and encrypted content(s);

receiving, at the terminal from the middle box, one or more of pseudo-request(s), request(s) for content, content(s), pseudo-identifier(s), and encrypted content(s);

establishing a communication channel with a first additional middle box between the first additional middle box and the terminal and between the first additional middle box and the middle box along the communication channel connecting the middle box and the terminal, wherein the first additional middle box transmits and receives one or more of pseudo-request(s), request(s) for content, content(s), pseudo-identifier(s), and encrypted content(s); and establishing a communication channel with one or more second additional middle box(es) along the communication channel connecting the middle box with the first additional middle box communicatively connected to the terminal, wherein the second additional middle box(es) transmit and receive one or more of pseudo-request(s), request(s) for content, content(s), pseudo-identifier(s), and encrypted content(s).

21. The method according to claim 20, wherein the content(s) and/or encrypted content(s) is encrypted by a key other than a session key.

22. The method according to claim 20, further comprising:
intercepting, by the middle box, a request to the server for content; and
relaying, by the middle box to the server, the request for content along with data that identifies the middle box, which data is used to aid transmission to the middle box of an identifier (optionally, pseudo-identifier) associated with the content.

23. The method according to claim 20, further comprising:
observing by the middle box a request to the server for encrypted content;
transmitting by the middle box to the server a notification of the presence of the middle box; and
receiving from the server at the middle box, after sending notification of its presence, encrypted content requested by the request.

24. The method according to claim 20, wherein the middle box comprises one of:
a network address translator;
a firewall;
a traffic shaper;
an intrusion detection system;
a transparent Web proxy cache;
an application accelerator;
a virus and/or malware scanner;
a parental control filter; and
a compression proxy.

25. The method according to claim 20, further comprising establishing a communication channel with a first additional middle box between the first additional middle box and the server and between the first additional middle box and the middle box along the communication channel connecting the middle box and the server, wherein the first additional middle box transmits and receives one or more of pseudo-request(s), request(s) for content, content(s), pseudo-identifier(s), and encrypted content(s).

26. The method according to claim 25, further comprising establishing a communication channel with one or more second additional middle box(es) along the communication channel connecting the middle box with the first additional middle box communicatively connected to the server, wherein the second additional middle box(es) transmit and receive one or more of pseudo-request(s), request(s) for content, content(s), pseudo-identifier(s), and encrypted content(s).

27. A method, at one or more terminal(s), comprising:
sending a request for encrypted content, the request including or accompanied simultaneously, before or after, by instructions causing communication between at least one server and at least one middle box, wherein one or more of the at least one server and the at least one middle box, indirectly or directly, cause(s):
(1) association of the encrypted content with an identifier(s) or pseudo-identifier(s),
(2) encryption of the content;
receiving the encrypted content associated with the identifier;
establishing a communication channel with a first additional middle box between the first additional middle box and the terminal and between the first additional middle box and the middle box along the communication channel connecting the middle box and the terminal, wherein the first additional middle box transmits and receives one or more of pseudo-request(s), request(s) for content, content(s), pseudo-identifier(s), and encrypted content(s); and
establishing a communication channel with one or more second additional middle box(es) along the communication channel connecting the middle box with the first additional middle box communicatively connected to the terminal, wherein the second additional middle box(es) transmit and receive one or more of pseudo-request(s), request(s) for content, content(s), pseudo-identifier(s), and encrypted content(s).

28. An oblivious content distribution network, comprising:
at least one terminal arranged to transmit, receive, or both transmit and receive key(s) and one or more of pseudo-request(s), request(s) for content, content(s), pseudo-identifier(s), and encrypted content(s);
a server arranged to transmit, receive, or both transmit and receive key(s) and one or more of pseudo-request(s), request(s) for content, content(s), pseudo-identifier(s), and encrypted content(s);
at least one middle box arranged to transmit, receive, or both transmit and receive, one or more of pseudo-request(s), request(s) for content, content(s), pseudo-identifier(s), and encrypted content(s);
wherein the network is arranged to:
establish a communication channel with a first additional middle box between the first additional middle box and the terminal and between the first additional middle box and the middle box along the communication channel connecting the middle box and the terminal, wherein the first additional middle box transmits and receives one or more of pseudo-request(s), request(s) for content, content(s), pseudo-identifier(s), and encrypted content(s); and
establish a communication channel with one or more second additional middle box(es) along the communication channel connecting the middle box with the first additional middle box communicatively connected to the terminal, wherein the second additional middle box(es) transmit and receive one or more of pseudo-request(s), request(s) for content, content(s), pseudo-identifier(s), and encrypted content(s).

29. The oblivious content distribution network according to claim 28, wherein at least one of the one or more communication channels coupling the terminal with the server are established by operations including, but not limited to:

establishing a Transmission Control Protocol channel with the server, at the terminal, and overlaying a Transport Layer Security channel with the server.

30. The oblivious content distribution network according to claim 28, wherein at least one of the one or more communication channels coupling the terminal with the middle box are established by operations including, but not limited to:

establishing a Transmission Control Protocol channel with the middle box, at the terminal, and overlaying a Transport Layer Security channel with the middle box.

* * * * *